US012686093B2

(12) United States Patent
Hashimoto

(10) Patent No.: US 12,686,093 B2
(45) Date of Patent: Jul. 21, 2026

(54) WORKPIECE POSITION DETERMINATION DEVICE, LASER MACHINING DEVICE, AND WORKPIECE POSITION DETERMINATION METHOD

(71) Applicant: MURATA MACHINERY, LTD., Kyoto (JP)

(72) Inventor: Shogo Hashimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 134 days.

(21) Appl. No.: 18/692,382

(22) PCT Filed: Aug. 24, 2022

(86) PCT No.: PCT/JP2022/031947
§ 371 (c)(1),
(2) Date: Mar. 15, 2024

(87) PCT Pub. No.: WO2023/047879
PCT Pub. Date: Mar. 30, 2023

(65) Prior Publication Data
US 2024/0383089 A1 Nov. 21, 2024

(30) Foreign Application Priority Data

Sep. 24, 2021 (JP) ................................. 2021-156087

(51) Int. Cl.
| | |
|---|---|
| *B23Q 17/24* | (2006.01) |
| *B23K 26/03* | (2006.01) |
| *B23K 26/70* | (2014.01) |
| *G05B 19/19* | (2006.01) |
| *G05B 19/401* | (2006.01) |

(52) U.S. Cl.
CPC ........ *B23Q 17/2428* (2013.01); *B23K 26/032* (2013.01); *B23K 26/70* (2015.10); *G05B 19/19* (2013.01); *G05B 19/401* (2013.01)

(58) Field of Classification Search
CPC ................ B23Q 17/2428; B23Q 17/22; B23Q 17/2233; B23Q 17/2471; B23K 26/032;
(Continued)

(56) References Cited

U.S. PATENT DOCUMENTS

| | | | |
|---|---|---|---|
| 2003/0178398 A1* | 9/2003 | Nagatoshi .............. | B23K 26/04 219/121.81 |
| 2008/0223839 A1* | 9/2008 | Maruyama ........... | B23K 26/066 219/121.83 |

(Continued)

FOREIGN PATENT DOCUMENTS

| | | | | |
|---|---|---|---|---|
| EP | 2937753 A1 * | 10/2015 | .......... | G05B 19/401 |
| EP | 2937753 B1 | 7/2019 | | |

(Continued)

OTHER PUBLICATIONS

Official Communication issued in International Patent Application No. PCT/JP2022/031947, mailed on Oct. 11, 2022.
Official Communication issued in corresponding European Patent Application No. 22872635.2, mailed on Aug. 28, 2025, 7 pages.
Official Communication issued in corresponding Chinese Patent Application No. 202280061562.X, mailed on Apr. 30, 2026, 11 pages.

*Primary Examiner* — Georgia Y Epps
*Assistant Examiner* — Erin R Garber
(74) *Attorney, Agent, or Firm* — Keating & Bennett, LLP

(57) ABSTRACT

A workpiece position determination device includes an imager, a driver to move the imager relative to a workpiece in a planar direction parallel to a planar surface of the imager, a controller to control the driver so that the imager moves along a prescribed trajectory that passes through locations in a boundary portion in the planar surface in a plan view, a storage to store image information captured by the imager while the imager moves along the prescribed trajectory, and coordinate information of the imager at a time (Continued)

of capturing each image information, a position determiner to determine the position of the workpiece in the planar direction corresponding to the boundary portion based on the image information and the coordinate information stored in the storage, and an offset determiner to determine an offset of the workpiece from a reference position based on a determination result from the position determiner.

12 Claims, 14 Drawing Sheets

(58) Field of Classification Search
CPC .... B23K 37/0408; B23K 26/60; B23K 26/70; B23K 26/03; G05B 2219/37575; G05B 2219/45041; G05B 19/401; G05B 19/19
See application file for complete search history.

(56) References Cited

U.S. PATENT DOCUMENTS

| | | | |
|---|---|---|---|
| 2016/0239949 A1 | 8/2016 | Ogawa | |
| 2017/0095885 A1 | 4/2017 | Zhang et al. | |
| 2017/0266758 A1 | 9/2017 | Fukui et al. | |
| 2018/0221990 A1 * | 8/2018 | Aoki | G02B 26/10 |
| 2021/0197313 A1 * | 7/2021 | Onoda | B23K 26/046 |
| 2023/0356346 A1 * | 11/2023 | Akiyama | G05B 19/402 |

FOREIGN PATENT DOCUMENTS

| | | | | |
|---|---|---|---|---|
| JP | 3660041 B2 | | 6/2005 | |
| JP | 5374909 B2 * | 12/2013 | | B23K 26/00 |
| JP | 2019115923 A * | 7/2019 | | |
| KR | 20180002344 A | | 1/2018 | |

* cited by examiner

R(R1)   Wh   Wb   R(R1)

Wa

TA(T)

TA0

R(R1)   R(R1)

R

X
Y ← ⊙ Z

WORKPIECE POSITION DETERMINATION DEVICE, LASER MACHINING DEVICE, AND WORKPIECE POSITION DETERMINATION METHOD

CROSS REFERENCE TO RELATED APPLICATIONS

This application claims the benefit of priority to Japanese Patent Application No. 2021-156087, the entire contents of which are hereby incorporated herein by reference.

BACKGROUND OF THE INVENTION

1. Field of the Invention

The present invention relates to workpiece position determination devices, laser machining devices, and workpiece position determination methods.

2. Description of the Related Art

Laser machining devices including a machining unit that irradiates a workpiece having a planar surface with a laser beam to thereby machine the workpiece are known. In such a laser machining device, a workpiece that has been machined by another machining device such as a press machine may be further subjected to laser machining. In such a case, the coordinate system of the machining unit of the laser machining device needs to be corrected in accordance with the machined portion of the workpiece. When correcting the coordinate system of the machining unit, for example, the position of a reference hole formed in the workpiece or the position of the outer peripheral end surface of the workpiece is detected, and the coordinate system of the machining unit is corrected based on the detection result.

When detecting a reference hole or end surface of a workpiece, a sensor such as a touch probe or a camera is used. This sensor is moved along the planar surface of the workpiece by a driver. A controller that controls the driver moves the sensor along the workpiece based on an estimated position preliminarily given as position information of the reference hole or end surface. At an estimated position, in order to detect a boundary position on a workpiece, the detection result yielded by the sensor is transmitted to the controller, and the controller determines whether or not a boundary has been detected. If it is determined that a boundary has been detected, the coordinates of one point on the boundary are determined based on the detection result, and the sensor is repeatedly moved by the driver to determine the coordinates of one point on the next boundary (for example, see Japanese Patent No. 3660041).

SUMMARY OF THE INVENTION

In the invention disclosed in Japanese Patent No. 3660041, it is necessary to repeatedly perform detection by a sensor, determination by a controller, and sensor movement by a driver, until the controller determines that a boundary has been detected. In such a case, the controller performs feedback control regarding the movement of the sensor after waiting to process the detection t acquired from the sensor, which makes one detection time-consuming. Since it is necessary to repeatedly communicate information between the sensor, the controller, and the driver, the overall control requires a relatively long communication time. For this reason, there was a risk of the length of time required to determine the position of a workpiece becoming long.

Example embodiments of the present invention provide workpiece position determination devices, laser machining devices, and workpiece position determination methods capable of reducing the length of time required to determine the position of a workpiece.

A workpiece position determination device according to an aspect of the present invention includes: an imager: a driver that causes the imager to move in a relative manner, with respect to a workpiece having a planar face, in a planar direction parallel to the planar face; a controller that controls the driver so that the imager moves along a prescribed trajectory that passes through a plurality of locations in a boundary portion in the planar face in a plan view; a memory storage that stores image information captured by the imager while the imager moves along the prescribed trajectory, and coordinates information of the imager at a time of capturing each image information; a position determiner that determines the position of the workpiece in the planar direction corresponding to the boundary portion, on the basis of the image information and the coordinates information stored in the memory storage; and an offset determiner that determines an offset of the workpiece from a position, a reference on the basis of determination result from the position determiner.

A laser machining device according to an aspect of an example embodiment of the present invention is a laser machining device including a machining unit to irradiate a workpiece including a planar surface with a laser beam to machine the workpiece, and includes the workpiece position determination device according to the above aspect of an example embodiment of the present invention.

A workpiece position determination method according to an aspect of the present invention includes: causing an imager to move relative to a workpiece having a planar face, in a planar direction parallel to the planar face and along a prescribed trajectory that passes through a plurality of locations in a boundary portion in the planar face in a plan view; storing image information captured by the imager while the imager moves along the prescribed trajectory, and coordinates information of the imager at a time of capturing each image information; determining the position of the workpiece in the planar direction corresponding to the boundary portion, on the basis of the image information and the coordinates information stored in the memory storage; and determining an offset of the workpiece from a reference position, on the basis of a result of determining the position corresponding to the boundary portion.

According to the workpiece position determination devices, the laser machining devices, and the workpiece position determination methods of example embodiments of the present invention, the imager is moved along a prescribed trajectory, image information captured during this period by the imager is stored in the storage, and the position of the workpiece is determined based on the stored image information. Accordingly, feedback control of the driver based on image information captured by the imager is not required. Therefore, it is not necessary to take into consideration delays in image processing calculations and delays in communications such as move instructions with respect to the movement of the imager, and as a result, the length of time required to determine the position of a workpiece can be reduced. As a result, the efficiency of machining a workpiece can be improved.

In a workpiece position determination device of an above aspect of an example embodiment of the present invention, an imaging optical system in the imager may be coaxial with a laser beam irradiation optical system in a machining unit of a laser machining device to machine a workpiece by irradiating the workpiece with a laser beam. According to such an aspect, since the imaging optical system of the imager is provided coaxially with the irradiation optical system of the machining unit, there is no need to offset the workpiece position determination result from the laser beam irradiation position, and as a result, it is possible to realize highly accurate position determination. In the workpiece position determination device of the above aspect, the controller may control the driver so that the imager captures an image of a reference hole provided in the workpiece while moving along a prescribed trajectory that passes through a plurality of locations on an inner peripheral edge of the reference hole in a plan view, and the position determiner may calculate a position of a center of the reference hole in the workpiece. According to such an aspect, it is possible, by moving the imager along a prescribed trajectory, to efficiently acquire image information at a plurality of locations on the inner peripheral edge of the reference hole, and it is possible to highly accurately calculate the center position from these pieces of image information.

In a workpiece position determination device of an above aspect of an example embodiment of the present invention, the controller may control the driver so that the imager moves along a trajectory that defines a prescribed point-symmetric shape or line-symmetric shape in a plan view. According to such an aspect, it is possible to efficiently acquire image information at a plurality of locations on the inner peripheral edge of the reference hole. It is also possible, by capturing images of the boundary portion from a plurality of directions, to improve the accuracy robustness of determination performed by the position determiner. In the workpiece position determination device of the above aspect, an observation range of one image captured by the imager may be smaller than the reference hole. According to such an aspect, since the observation range is smaller than the reference hole, it is possible to highly accurately acquire image information of the inner peripheral edge of the reference hole.

In a workpiece position determination device of an above aspect of an example embodiment of the present invention, the controller may control the driver so that the imager captures an image of an end portion corresponding to a side of the workpiece while moving along a prescribed trajectory that passes through a plurality of locations on the end portion in a plan view, and the position determiner may calculate a position of an end portion of the workpiece. According to such an aspect, it is possible, by moving the imager along a prescribed trajectory, to efficiently acquire image information of an end portion corresponding to a side of a workpiece. In the workpiece position determination device of the above aspect, the controller may control the driver so that the imager moves along a trajectory that defines prescribed linear shape, a curved shape, a zigzag shape, or a spiral shape in a plan view. According to such an aspect, it is possible to efficiently acquire image information at a plurality of locations on an end portion of a workpiece.

In a workpiece position determination device of an above aspect of an example embodiment of the present invention, the position determiner may select, from a plurality of pieces of image information captured by the imager, image information used to determine the position of a boundary portion, and determine the position of the boundary portion, based on the coordinates information corresponding to the image information selected. According to such an aspect, since less pieces of image information than all pieces of captured image information are processed, it is possible to speed up the determination process. In the workpiece position determination device of the above aspect, the offset determiner may determine, from a result of determining a position of at least one of the boundary portions, a shift amount relative to the reference position in both a first direction and a second direction orthogonal to each other. According to such an aspect, since the amount of shift in both the first direction and the second direction and the amount of rotation around the axis of a third direction are determined from the position of at least one boundary portion, it is possible to efficiently determine the offset of the workpiece relative to the reference position. In the workpiece position determination device of the above aspect, the offset determiner may determine, from results of determining positions of at least three of the boundary portions, the shift amount relative to the reference position in both the first direction and the second direction orthogonal to each other, and the rotation amount around the axis of the third direction orthogonal to the first direction and the second direction. According to such an aspect, since the amount of shift both the first direction and the second direction is determined, it is possible to accurately determine the offset of the workpiece relative to the reference position.

The above and other elements, features, steps, characteristics and advantages of the present invention will become more apparent from the following detailed description of the example embodiments with reference to the attached drawings.

Figure 1:
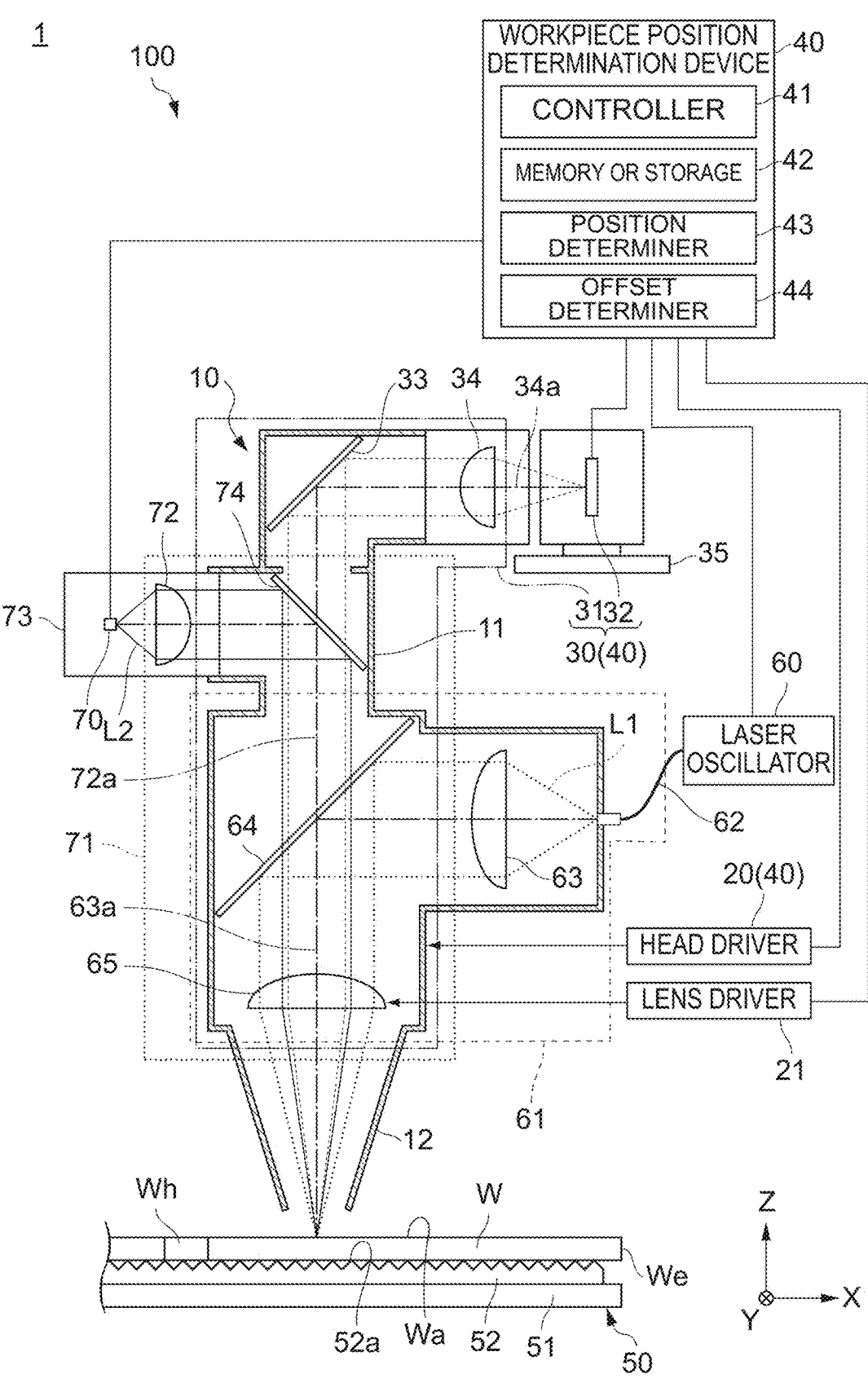
FIG. 1 is a diagram showing an example of a workpiece position determination device and a laser machining device according to an example embodiment of the present invention.

DETAILED DESCRIPTION OF THE EXAMPLE
EMBODIMENTS

Hereunder, example embodiments will be described, with reference to the drawings. However, it should be noted that the present invention should not be considered limited to the example embodiments described below. In the drawings, scale may be changed as necessary to illustrate the example embodiments, such as by enlarging, reducing, or emphasizing a portion, and the shapes and dimensions in the drawings may differ from those of the actual product. In the drawings, an XYZ Cartesian coordinate system may be used to describe the directions in each drawing. In the XYZ Cartesian coordinate system, the vertical direction is taken as the Z direction, and the horizontal directions are taken as the X direction and the Y direction. In each direction, the direction of the arrow is referred to as + direction (for example, +X direction or +X side direction), and the side opposite to the direction of the arrow is referred to as – direction (for example, –X direction or –X side direction).

FIG. 1 is a diagram showing an example of a workpiece position determination device 40 and a laser machining device 1 according to the present example embodiment. In the present example embodiment, the workpiece position determination device 40 is included in the configuration of the laser machining device 1. The workpiece position determination device 40 includes a head driver (driver) 20, an imager 30, a controller 41, a memory or storage 42, a position determiner 43, and an offset determiner 44. Each component of the workpiece position determination device 40 will be described as appropriate when describing the laser machining device 1. The laser machining device 1 includes a machining unit 100. The machining unit 100 is capable of cutting a plate-shaped machining target workpiece W by irradiating it with a laser beam L1. The machining unit 100 performs laser machining (cutting machining, drilling machining) on the workpiece W transported into the machining region. Transporting an unmachined workpiece W to a position where laser machining can be performed by the machining unit 100 and transporting the machined workpiece W out of the position may be performed by moving a machining pallet 50, which will be described later, or by a loader device or the like not shown in the drawings. The laser machining device 1 may be, for example, a composite processing machine in which the machining unit 100 is arranged adjacent to another machining unit such as a punch press.

The machining unit 100 includes a laser head 10, a lens driver 21, and a machining pallet 50. The machining unit 100 shares the head driver 20 and the imager 30 with the workpiece position determination device 40. That is to say, the machining unit 100 includes the head driver 20 and the imager 30. The laser head 10 includes a head main body 11 and a nozzle 12 and performs cutting machining and drilling machining on a workpiece W by irradiating a planar surface Wa of the workpiece W with a laser beam L1. When performing cutting machining on the workpiece W, the laser head 10 irradiates the laser beam L1 while being driven by the head driver 20 to move the laser beam L1 along a predetermined cutting line. The laser head 10 is connected to a laser light source such as a laser oscillator 60.

The laser oscillator 60 generates, for example, an infrared laser beam serving as the laser beam L1. As the laser light source, for example, a carbon dioxide gas laser light source, a solid-state laser light source, or the like may be used. The laser head 10 has an irradiation optical system 61. The irradiation optical system 61 guides and then converges the laser beam L1 generated by the laser oscillator 60. The irradiation optical system 61 includes an optical fiber 62, a collimator 63, a beam splitter 64, and a condenser lens 65. The optical fiber 62 connects the laser oscillator 60 and the laser head 10. The laser beam L1 emitted from the laser oscillator 60 is introduced into the laser head 10 via the optical fiber 62.

The collimator 63 converts the laser beam L1 emitted from the laser oscillator 60 into a parallel beam or approximates it to a parallel beam. The beam splitter 64 is arranged at an incidence position of the laser beam L1 that has passed through the collimator 63. The beam splitter 64 is a wavelength selective mirror that has the property of reflecting the laser beam L1 and transmitting an illumination laser beam L2, which will be described later. Upon being reflected by the beam splitter 64, the laser beam L1 has its optical path bent approximately 90 degrees from the X direction to the Z direction (to the –Z side) and enters the condenser lens 65. The condenser lens 65 condenses the laser beam L1 from the collimator 63. The condenser lens 65 is movable along an optical axis 63a. The laser beam L1 is converged by the irradiation optical system 61 so as to form a spot having a predetermined diameter on the workpiece W. The diameter of the spot can be adjusted, for example, by moving the condenser lens 65 using the lens driver 21. The lens driver 21 is controlled by the controller 41.

Within the machining unit 100, the head main body 11 is arranged above (on the +Z side) the workpiece W arranged in the machining region. The head main body 11 is movable relative to the workpiece W in the X direction, Y direction, and Z direction by being driven by the head driver 20. The head driver 20 includes, for example, a gantry that is movable in the X direction, a slider that is movable in the Y direction relative to the gantry, and an elevator that is movable in the Z direction relative to the slider. The head driver 20 moves the head main body 11 to predetermined positions in the X direction, Y direction, and Z direction by driving the gantry, the slider, and the elevator, respectively. It should be noted that the head driver 20 is not limited to the above configuration and may be of another configuration such as a robot arm.

The nozzle 12 is attached to the lower side (–Z side) of the head main body 11 so as to face in the –Z direction (downward) and irradiates the laser beam L1 in the –Z direction (downward). The nozzle 12 is connected to an assist gas feeder not shown in the drawings via a gas feed pipe or the like, and directs assist gas (for example, nitrogen gas) from the assist gas feeder toward the portion to be irradiated with the laser beam L1 to supply it to the workpiece W.

The machining unit 100 is capable of illuminating the workpiece W with the illumination laser beam L2. A laser array 70 emits from a plurality of laser elements the illumination laser beam L2 having a wavelength different from that of the laser beam L1. The laser array 70 is controlled to be driven by the controller 41 and is housed in a housing 73. An illumination optical system 71 illuminates the workpiece W with the illumination laser beam L2 generated by the laser array 70. The illumination optical system 71 includes a collimator 72, a half mirror 74, a beam splitter 64, and a condenser lens 65. The illumination optical system 71 shares the beam splitter 64 and the condenser lens 65 with the irradiation optical system 61 and provides epi-illumination via the condenser lens 65. An optical axis 72a on the light output side of the illumination optical system 71 and an optical axis 63a on the light output side of the illumination optical system 61 are coaxial with each other, and the illumination laser beam L2 passes through the same optical path as the laser beam L1 to be irradiated on the Workpiece W.

The collimator 72 is provided at an incidence position of the illumination laser beam L2 from the laser array 70. The collimator 72 converts the illumination laser beam L2 emitted from the laser array 70 into a parallel beam or approximates it to a parallel beam. The half mirror 74 is a reflective-transmissive member having a property of partly reflecting and partly transmitting the illumination laser beam L2. The illumination laser beam L2 having passed through the collimator 72 is reflected by the half mirror 74 to have its optical path bent approximately 90 degrees from the X direction to the Z direction (to the −Z side) and enters the beam splitter 64. After having passed through the beam splitter 64, the illumination laser beam L2 is condensed by the condenser lens 65 to illuminate the workpiece W. The region that is illuminated by the illumination laser beam L2 is set so as to include a portion on the workpiece W to be irradiated with the laser beam L1. The region illuminated by the illumination laser beam L2 can be changed by moving the condenser lens 65 using the lens driver 21.

The imager 30 images the planar surface Wa of the workpiece W. The imager 30 images a cut portion of the workpiece W irradiated with the laser beam L1. The imager 30 moves integrally with the head main body 11 in the X direction, Y direction, and Z direction. That is to say, the head driver 20 is a driver that relatively moves the imager in a planar direction parallel to the planar surface Wa of the workpiece W.

The imager 30 includes an imaging optical system 31 and an imaging element 32 and detects light from the workpiece W (return light) via the imaging optical system 31, using the imaging element 32. As the imaging element 32, for example, a CCD or CMOS image sensor is used, and the image formed by the imaging optical system 31 is captured. The imaging element 32 has provided therein a plurality of pixels that are arranged two-dimensionally. Each pixel has provided therein a light receiving element such as a photodiode. The imaging element 32 sequentially reads the electrical charges (signals) generated in the pixels when light (return light) enters the light receiving elements, amplifies the read signals, A/D converts them, and arranges them in an image format, thereby generating digital data of a captured image.

The imaging optical system 31 includes the condenser lens 65, the beam splitter 64, the half mirror 74, a wavelength selective filter 33, and an imaging lens 34. The imaging optical system 31 shares the condenser lens 64 and the beam splitter 65 with the irradiation optical system 61. The imager 30 can image the workpiece W in a manner coaxial with the irradiation optical system 61. That is to say, the optical axis 34a of the imaging optical system 31 and the optical axis 63a of the irradiation optical system 61 are coaxial with each other at the condenser lens 65 and the beam splitter 64.

The imaging element 32 is held, for example, by an alignment device 35, and the position thereof with respect to the imaging optical system 31 can be adjusted by the alignment device 35. For example, if the focal point (image plane position) of the imaging optical system 31 deviates from the imaging element 32 in a direction parallel to the optical axis 34a of the imaging lens 34 (X direction), the alignment device 35 can bring the focus of the imaging optical system 31 to the position of the imaging element 32 by moving the imaging element 32. Instead of moving the imaging element 32 by the alignment device 35, the imaging lens 34 may be moved in a direction parallel to the optical axis 34a to align the focal position with the imaging element 32.

The return light from the workpiece W passes through the condenser lens 65 and enters the beam splitter 64. The return light includes, for example, of the illumination laser beam L2, the light that is reflected and diffused by the workpiece W and the light that originates from the irradiation of the laser beam L1. Of the return light incident on the beam splitter 64, the light originating from the illumination laser beam L2 passes through the beam splitter 64 and enters the half mirror 74. Of the return light incident on the beam splitter 64, the light originating from the irradiation of the laser beam L1 is reflected by the beam splitter 64 and excluded from the optical path from the beam splitter 64 to the half mirror 74.

The return light that has entered the half mirror 74 separates into light that passes through the half mirror 74 and enters the wavelength selective filter 33, and light that is reflected by the half mirror 74. The wavelength selective filter 33 has a property of reflecting light in a wavelength band that is reflected by the workpiece W as a result of illumination of the illumination laser beam L2. The wavelength selective filter 33 also has a property of transmitting light in a wavelength band that is radiated by the workpiece W as a result of illumination of the laser beam L1. The wavelength selective filter 33 is, for example, a dichroic mirror, a notch filter, or the like. That is to say, of the return light, the light originating from the illumination laser beam L2 is reflected by the wavelength selective filter 33 and enters the imaging lens 34. As a result, disturbance light included in the returned light can be blocked, improving the S/N ratio of the image. The imaging lens 34 focuses the light reflected by the wavelength selective filter 33 onto the imaging element 32. The imaging lens 34 and the condenser lens 65 project the image of the workpiece W onto the imaging element 32. The imager 30 primarily generates digital data of a captured image according to light (return light) in the wavelength band that is reflected by the workpiece W as a result of illumination of the illumination laser beam L2.

The controller 41 of the workpiece position determination device 40 is configured or programmed to control the head driver 20 so that the imager 30 (head main body 11) moves along a prescribed trajectory that passes through a plurality of locations on a boundary portions Wb (see FIG. 3 and so forth) on the planar surface Wa of the workpiece W in a plan view (as viewed in the Z direction). In the present example embodiment, the controller 41 is configured or programmed to comprehensively control the machining unit 100 of the laser machining device 1. The boundary portion Wb will be described in detail later. The memory storage 42 stores image information captured by the imager 30 while the imager 30 moves along the prescribed trajectory, and coordinates information of the imager 30 at the time of capturing each image information. The coordinates information of the imager 30 is coordinates information on the planar surface Wa of the workpiece W captured by the imager 30. The position determiner 43 determines the position of the workpiece W in the planar direction corresponding to the boundary portion Wb, based on the image information and the coordinates information stored in the memory or storage 42. The offset determiner 44 determines the offset of the workpiece W from a reference position, based on a determination result from the position determiner 43. The reference position is used in the sense that it includes reference coordinates. As the reference position, for example, information on a position to be compared may be used, or preliminarily set reference coordinates may be used. The offset determiner 44 may determine the offset of the workpiece W relative to the reference coordinates, from the coordinates of the position corresponding to the boundary portion Wb determined by the position determiner 43, for example. The processing performed in the controller 41, the memory or storage 42, the position determiner 43, and the offset determiner 44 will be described later.

The machining pallet 50 has the workpiece W placed thereon, and the workpiece W is arranged in the machining region within the machining unit 100. For example, the machining pallet 50 may be movable in the X direction and the Y direction by a driving device not shown in the drawings, with the workpiece W placed thereon. The machining pallet 50 includes a base 51 and a supporting plate 52. The supporting plate 52 includes an upper end portion 52a with a saw-toothed shape, and a plurality of the teeth are arranged in a line on the base 51. The workpiece W is placed on the supporting plate 52. At this time, since the upper end portion 52a preferably has a saw-toothed shape, the area of contact with the workpiece W is small. It should be noted that the supporting plate 52 is not limited to having a saw-toothed shape, and may have a serrated shape, a wave shape, or a plurality of pins, for example. Whether or not to use the machining pallet 50 is optional. For example, instead of the machining pallet 50, a workpiece placement part may be provided in the machining region within the machining unit 100.

Figure 2:
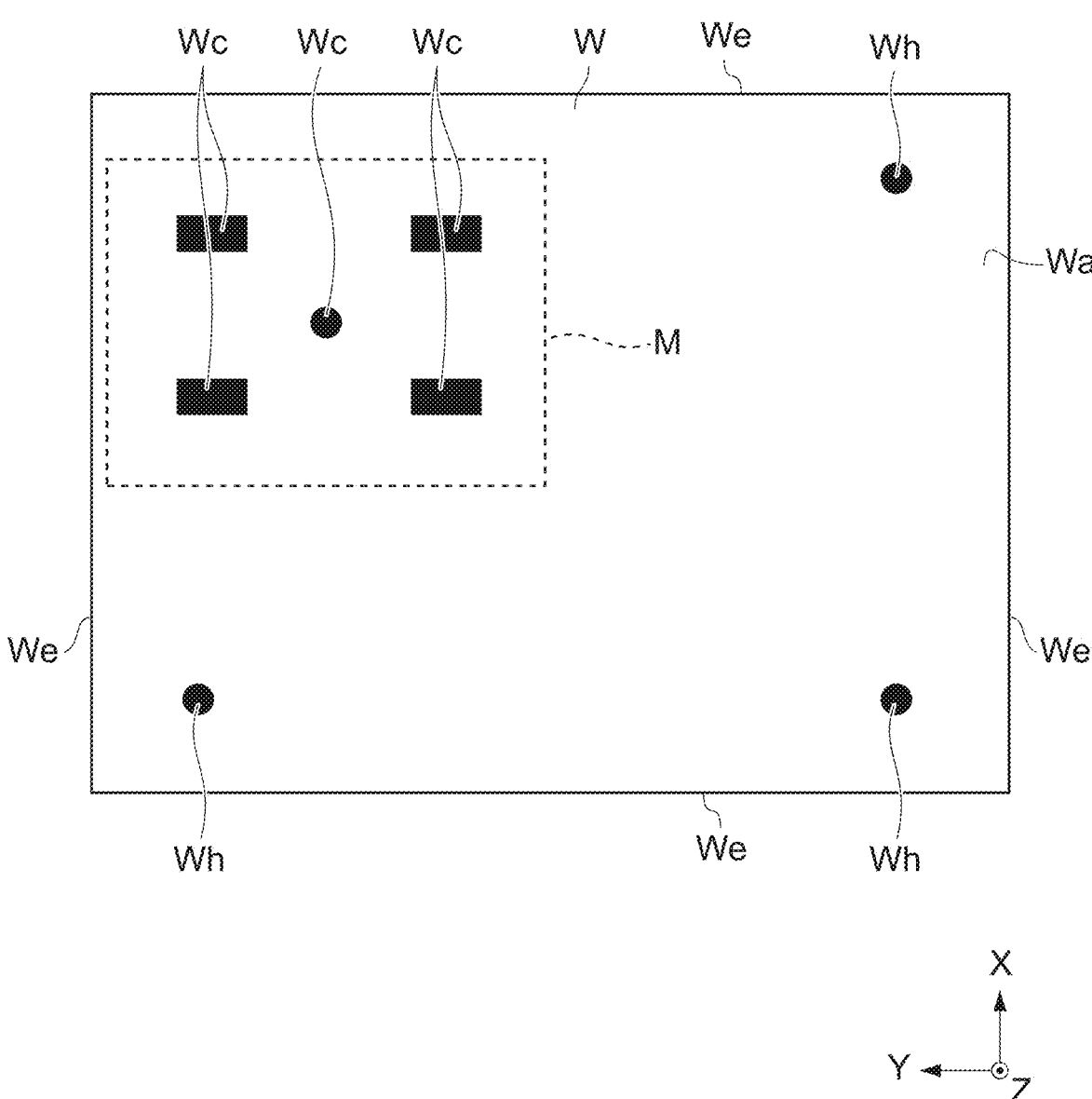
FIG. 2 is a diagram showing an example of a workpiece W to be machined by a laser machining device.

FIG. 2 is a diagram showing an example of the workpiece W to be machined by the laser machining device 1. In the present example embodiment, for example, a workpiece W that has been machined (preliminarily machined) by another machining device such as a press machine is further subjected to laser machining in the laser machining device 1. The workpiece W as a whole may have a rectangular or substantially rectangular plate shape and include a planar surface Wa and end portions We corresponding to four sides. The workpiece W has a hole Wc and reference holes Wh formed by another machining device. The hole Wc is provided in a portion of the workpiece W that corresponds to a product M to be cut out by the laser machining device 1. It should be noted that the hole Wc may be of a shape penetrating from the top side to the bottom side of the workpiece W in the thickness direction or may be of a bottom-ended hole shape. Three of the reference holes Wh, which are circular in a plan view (as viewed in the Z direction), are formed for the workpiece position determination device 40 to determine the offset of the workpiece W from the reference position. The reference holes Wh may not be formed for a reason such as that the proportion of the product M to the workpiece W is large and a margin cannot be ensured. In such a case, as will be described later, a configuration may have the end portion We of the workpiece W detected as a boundary portion Wb.

In the present example embodiment, as in the workpiece W shown in FIG. 2, the reference holes Wh unrelated to the product M are used to determine the offset of the workpiece W, however, the present invention is not limited to this example. For example, the hole Wc necessary for the product M may be used as a reference hole Wh to determine the offset of the workpiece W. The three reference holes Wh are arranged near three of the four corners of the workpiece W. By arranging the three reference holes Wh in this manner, a long distance can be ensured between the reference holes Wh, and the position of the workpiece W can be determined highly accurately. The reference hole Wh is not limited to being of a circular shape, and may be of a polygonal shape, an elliptical shape, an oval shape, or the like, for example. The reference hole Wh may be of a shape penetrating from the top side to the bottom side of the workpiece W in the thickness direction or may be of a bottom-ended hole shape. That is to say, the reference hole Wh may have any shape given that the appearance thereof differs from the planar surface Wa when the imager 30 images the planar surface Wa, and that the boundary portion Wb is discernible from the image captured by the imager 30.

Figure 3:
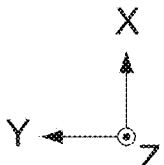
FIG. 3 is a diagram showing an example of the relationship between a reference hole and an observation range of an imager.

FIG. 3 is a diagram showing an example of the relationship between the reference hole Wh and an observation range R of the imager 30. As shown in FIG. 3, the controller 41 controls the head driver 20 so that the imager 30 captures an image of the reference hole Wh provided in the workpiece W while moving along a prescribed trajectory TA that passes through a plurality of locations on the boundary portion Wb, which is the inner peripheral edge of the reference hole Wh in a plan view (hereunder, prescribed trajectory TA and the like may be collectively referred to as trajectories T). The imager 30 can acquire an image of a region within the observation range (image acquisition range) R. In other words, the observation range R is an imaging range to be acquired by the imager 30 through a single imaging operation. As the imager 30 moves along the prescribed trajectory TA, the observation range R moves together with the imager 30. The prescribed trajectory TA is a trajectory that is preliminarily set such that the observation range R of the imager 30 passes through a plurality of locations on the boundary portion Wb of the planar surface Wa. In the present example embodiment, the observation range R is set to be smaller than the reference hole Wh.

Figure 4:
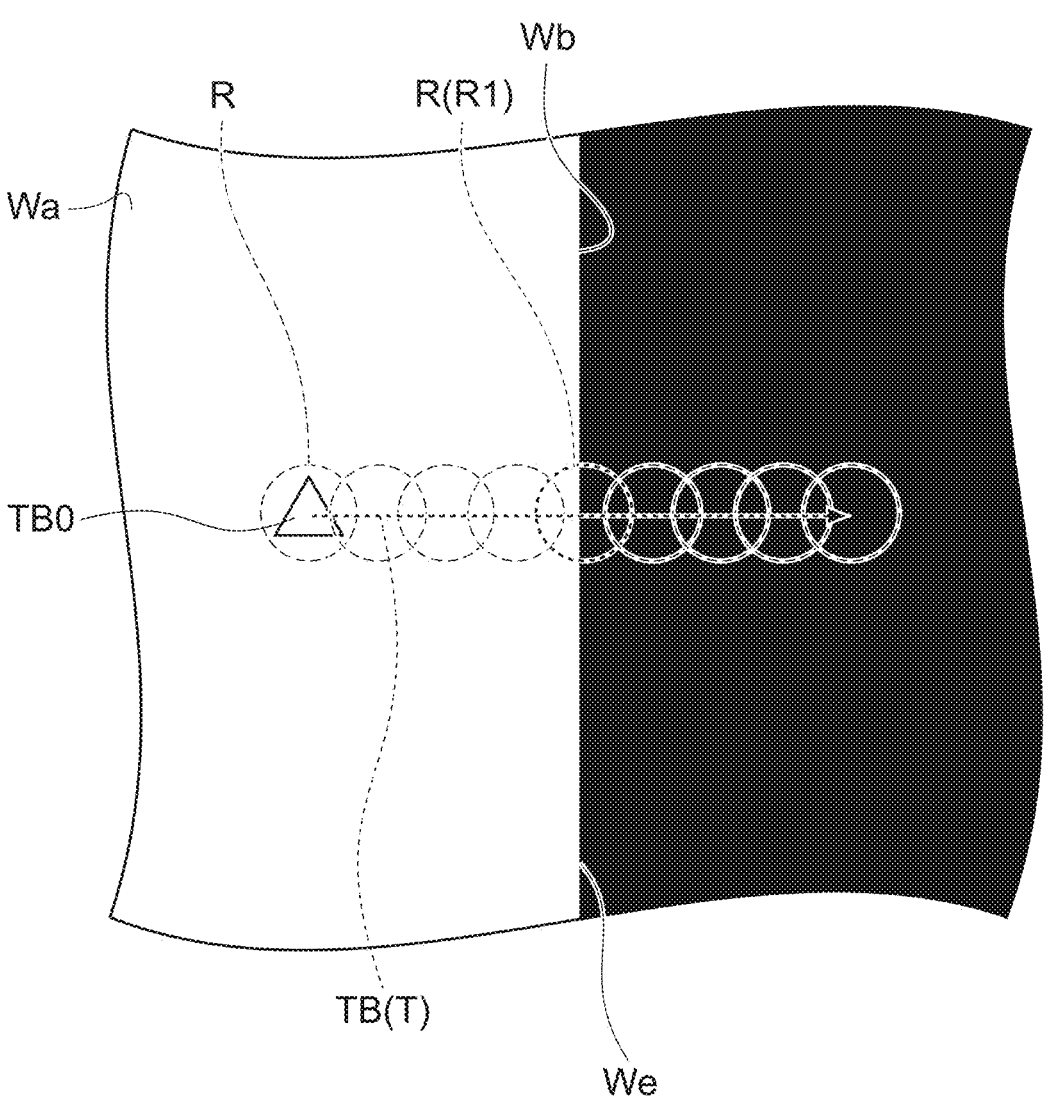
FIG. 4 is a diagram showing an example of the relationship between an end portion and an observation range of the imager.
Figure 4:
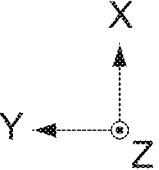

The prescribed trajectory TA is preliminarily stored in the memory or storage 42. The prescribed trajectory TA is set according to the shape and dimensions of the reference hole Wh. The controller 41 reads out the prescribed trajectory TA stored in the memory or storage 42 and controls the head driver 20 to move the imager 30 (head main body 11) so that the observation range R moves along the trajectory TA. The controller 41 acquires estimated position information and shape information of the reference hole Wh in the workpiece W, from the machining device or the like that has machined the machined portion of the workpiece W. Here, the estimated position information of the reference hole Wh acquired preliminarily refers to information regarding the estimated position of the reference hole Wh strictly in the state where the workpiece W is placed at the reference position S with no offset (see FIG. 12). Similarly, the phrase "estimated position information" is used hereinafter to mean information regarding the estimated position in the state where the workpiece W is placed at the reference position S with no offset. The controller 41 sets a start point (for example, X, Y coordinate values) TA0 at which the prescribed trajectory TA starts, based on the estimated position information and shape information of the target reference hole Wh. In FIG. 3 and FIG. 4, the start point TA0 is denoted by a triangle.

The controller 41 moves the imager 30 to the start point TA0 and moves the imager 30 along the prescribed trajectory TA from the start point TA0. As shown in FIG. 3, the prescribed trajectory TA is a so-called traversable path which, in a plan view, crosses the reference hole Wh from the start point TA0, then moves on the planar surface Wa, and crosses the reference hole Wh again from a different position. The imager 30 performs imaging at a predetermined frame rate while moving along the prescribed trajectory TA. That is to say, the imager 30 continuously acquires a plurality of images along the prescribed trajectory TA. The frame rate is set preliminarily based on the moving speed and so forth of the imager 30.

Information regarding the plurality of images (image information) captured by the imager 30 is stored in the memory or storage 42. The controller 41 acquires information (coordinates information) regarding the coordinate values of the imager 30 (observation range R) at the time of imaging and stores the coordinates information in the memory or storage 42 in association with the image information. The controller 41 may acquire, as the coordinates information of the imager 30, for example, the position (X, Y coordinate values) of the laser head 10 at the timing of imaging from the head driver 20 or the like, or from the output of a distance sensor or the like not shown in the drawings that measures the position of the laser head 10. For each image information, the memory or storage 42 stores coordinates information of the imager 30 (laser head 10) at the timing of capturing each image information, in association with the image information.

In the case where the observation range R is moved along a prescribed trajectory TA, the observation range R at a position including the boundary portion Wb can be estimated from estimated position information and shape information of the reference hole Wh acquired preliminarily. The controller 41 may store an image estimated to be at a position including the boundary portion Wb in the memory or storage 42, for example, as a specific image, distinguishing it from other images. In FIG. 3 and FIG. 4, the observation range R in which the specific image is estimated to have been captured is represented as observation range R1. The controller 41 acquires a plurality of pieces of image information and coordinate information for each of the three reference holes Wh through the processing described above and stores them in the memory or storage 42.

FIG. 4 is a diagram showing an example of the relationship between an end portion We and the observation range R of the imager 30. As shown in FIG. 4, the controller 41 controls the head driver 20 so that the imager 30 captures the image of the end portion We corresponding to a side as the workpiece W is viewed as a rectangle, while moving along a prescribed trajectory TB that passes through a plurality of locations on the end portion We, which is the boundary portion Wb in a plan view. As with the above description, the imager 30 can acquire the image of a region within the observation range R. The prescribed trajectory TB is preliminarily set so that the observation range R of the imager 30 passes through a plurality of locations on the boundary portion We (boundary portion Wb). The prescribed trajectory TB is set according to the position of the end portion We of the workpiece W. The controller 41 reads out the prescribed trajectory TB stored in the memory or storage 42 and moves the observation range R along the trajectory TB. The controller 41 acquires estimated position information of the end portion We of the workpiece W. The controller 41 sets a start point (for example, X, Y coordinate values) TB0 at which the prescribed trajectory TB starts, based on the estimated position information of the target end portion We.

The controller 41 moves the imager 30 to the start point TB0 and moves the imager 30 along the prescribed trajectory TB from this start point TB0. As shown in FIG. 4, the prescribed trajectory TB is a path of linear movement in the −Y direction from the start point TB0. The imager 30 performs imaging at a predetermined frame rate while moving along the prescribed trajectory TB and acquires a plurality of images. As with the above description, information regarding the plurality of images (image information)

captured by the imager 30 is stored in the memory or storage 42, and coordinates information at the time of capturing the images are stored in the memory or storage 42 in association with the image information. The controller 41 acquires and stores in the memory or storage 42 a plurality of pieces of image information and coordinates information through the processing described above, for two different locations on the end portion We in the X direction and one location on the end portion We in the Y direction, respectively, for example.

Figure 5A:
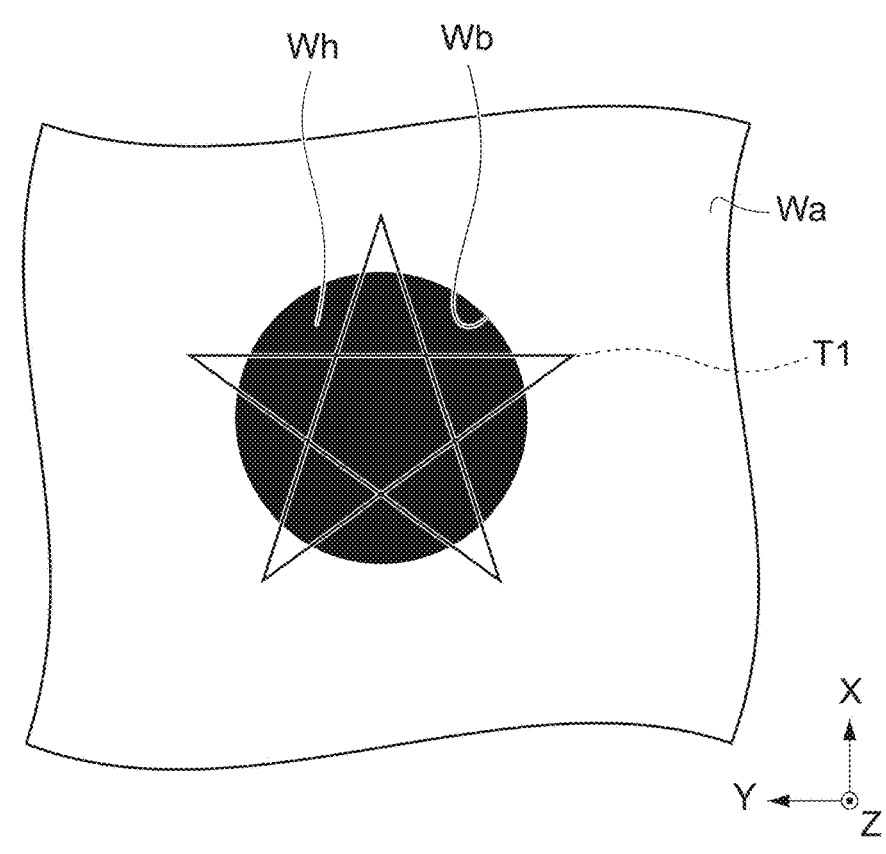
FIGS. 5A and 5B are diagrams showing an example of a prescribed trajectory set for a reference hole.
Figure 5B:
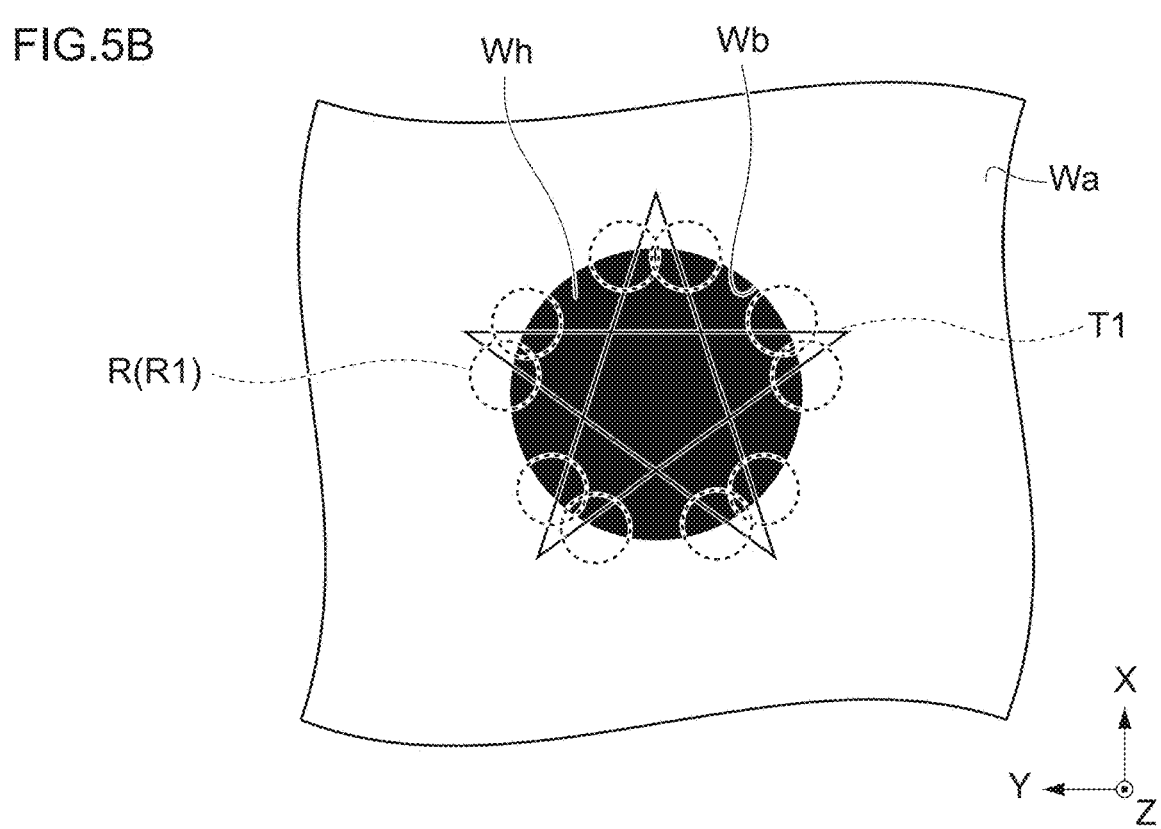

FIGS. 5A and 5B to FIGS. 7A and 7B are diagrams showing examples of prescribed trajectories T set for the reference hole Wh. As shown in FIG. 5A, a prescribed trajectory T1 is set in the shape of a pentagram (five-pointed star, star-shaped pentagon) in a plan view, and passes through a plurality of locations on the boundary portion Wb. The prescribed trajectory T1 is a so-called traversable path. The size of the pentagram shape is set according to the size of the reference hole Wh acquired preliminarily. The imager 30 performs imaging while moving the observation range R along the prescribed pentagram-shaped trajectory T1 in a plan view. As a result, as shown in FIG. 5B, it is possible to acquire specific images including the boundary portion Wb in the observation range R1 at 10 locations, among the plurality of captured images.

Figure 6A:
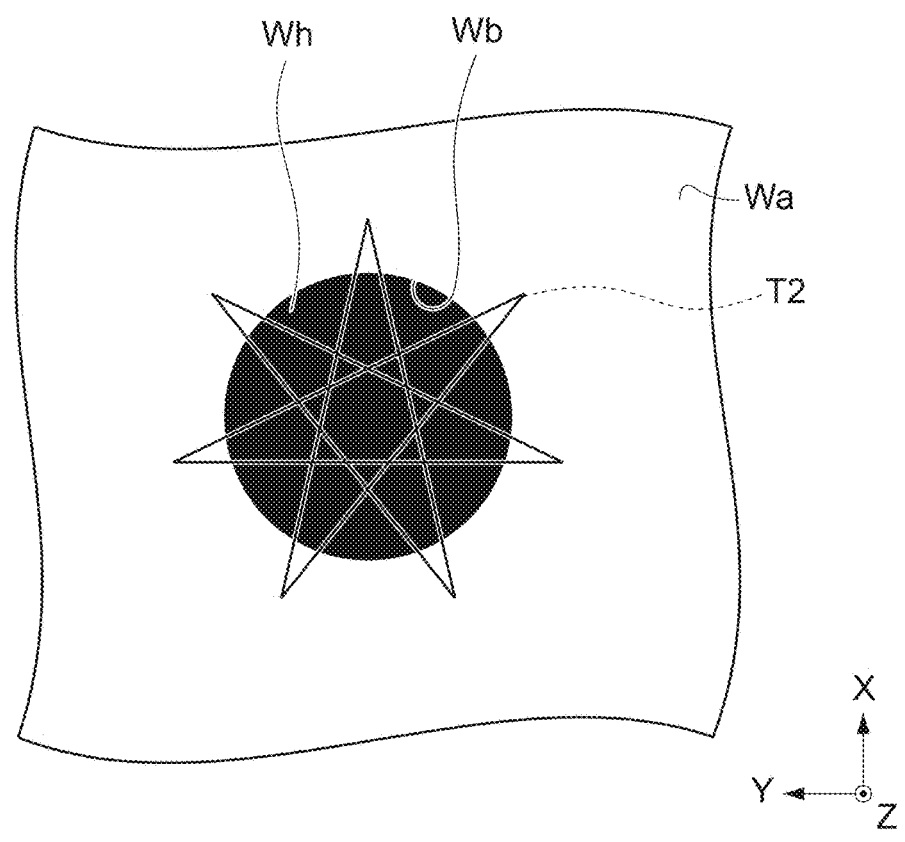
FIGS. 6A and 6B are diagrams showing examples of prescribed trajectories set for a reference hole.
Figure 6B:
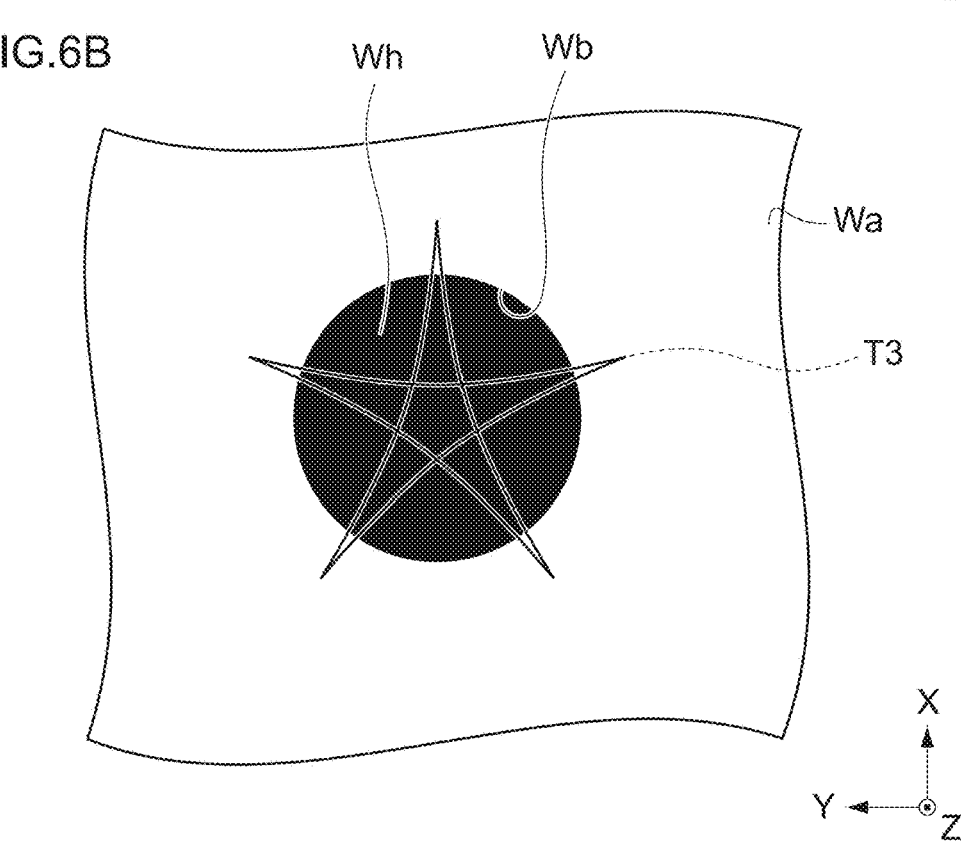
Figure 7A:
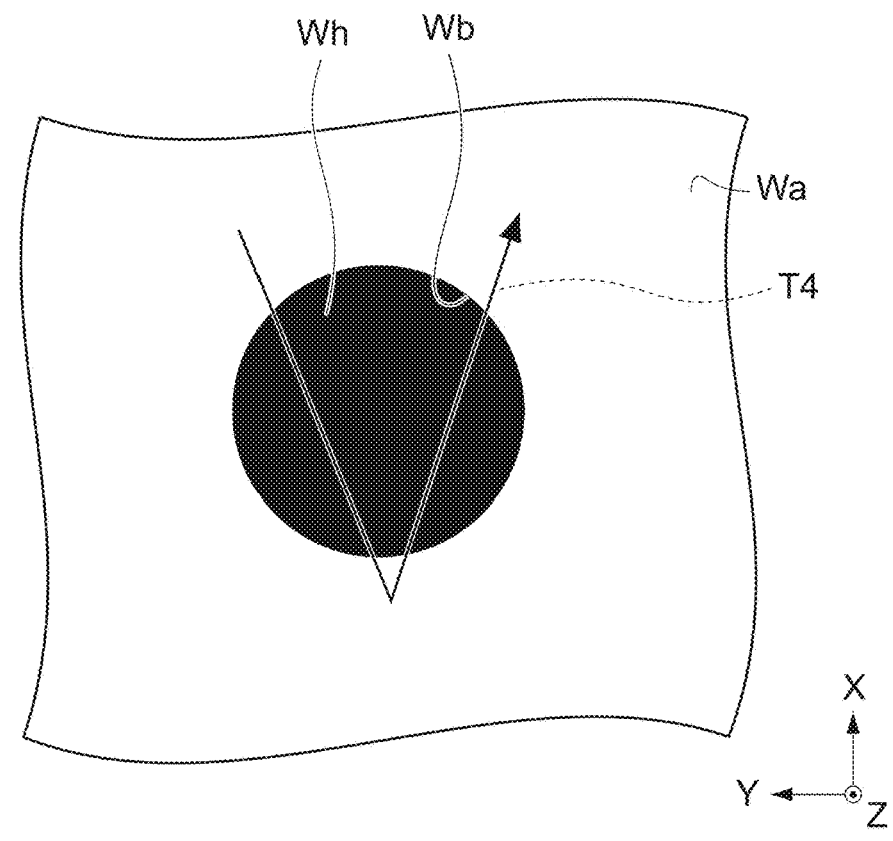
FIGS. 7A and 7B are diagrams showing examples of prescribed trajectories set for a reference hole.
Figure 7B:
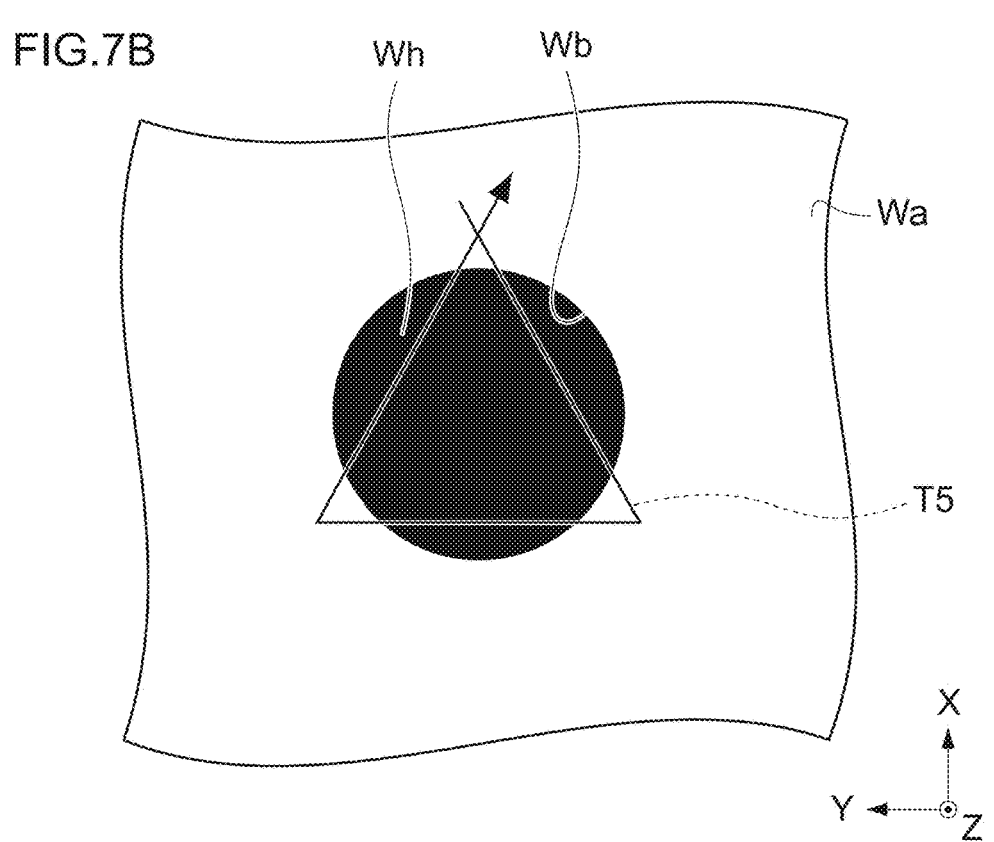

The prescribed trajectory T may be a trajectory other than the pentagram-shaped prescribed trajectory T1. For example, as shown in FIG. 6A, a prescribed trajectory T2 may be set in the shape of a heptagram (seven-pointed star, star-shaped heptagon) in a plan view. This prescribed trajectory T2 also passes through a plurality of locations on the boundary portion Wb. The prescribed trajectory T2 is also a so-called traversable path. As shown in FIG. 6B, a prescribed trajectory T3 may be used in which at least one line segment in a pentagram shape is curved, for example. The prescribed trajectory T is not limited to the shape of a pentagram but may also be any other shape as long as it passes through a plurality of locations on the boundary portion Wb. For example, as shown in FIG. 7A, the trajectory T may be a V-shaped prescribed trajectory T4, or as shown in FIG. 7B, it may be a triangular prescribed trajectory T5. As described above, the controller 41 may control the head driver 20 so that the imager 30 moves along any of the prescribed trajectories T1 to T5 that forms a prescribed point-symmetric shape or line-symmetric shape in a plan view. It is possible, by moving the imager 30 along any of the prescribed trajectories T1 to T5 that forms a point-symmetric shape or a line-symmetric shape, to efficiently acquire image information at a plurality of locations on the inner peripheral edge of the reference hole Wh. It is also possible, by capturing images of the boundary portion Wb from a plurality of directions, to improve the accuracy robustness of determination performed by the position determiner 43.

Figures 8A, 8B, 8C:
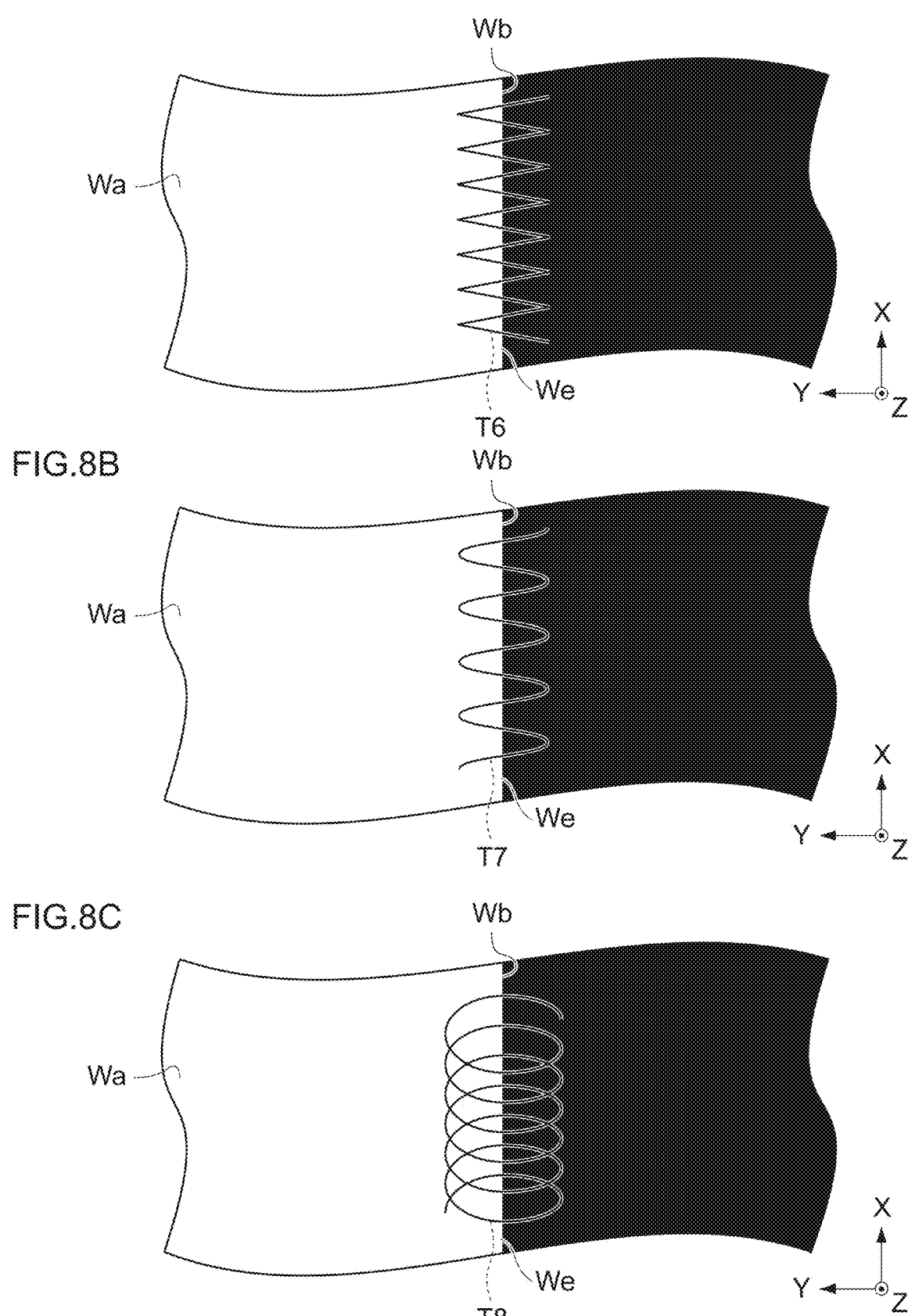
FIGS. 8A to 8C are diagrams showing examples of prescribed trajectories set for an end portion.

FIGS. 8A to 8C are diagrams showing examples of prescribed trajectories T set for the end portion We of the workpiece W. As shown in FIG. 8A, the prescribed trajectory T6 may be of a shape including straight lines in a zigzag pattern repeatedly crossing the end portion We that is the boundary portion Wb. As shown in FIG. 8B, the prescribed trajectory T7 may also be of a wave shape (continuous sine curve shape) that changes so as to repeatedly cross the end portion We. As shown in FIG. 8C, the prescribed trajectory 18 may also be of a spiral shape along the end portion We. The spiral shape in the prescribed trajectory T8 corresponds, for example, to a shape obtained by orthogonally projecting along the end portion We the spiral shape as a three-dimensional shape in a tilted state. The imager 30 performs imaging while moving the observation range R along any of the prescribed trajectories 16 to T8. As a result, it is possible to acquire specific images including the boundary portion Wb at a plurality of locations, among the plurality of captured images.

Figure 9:
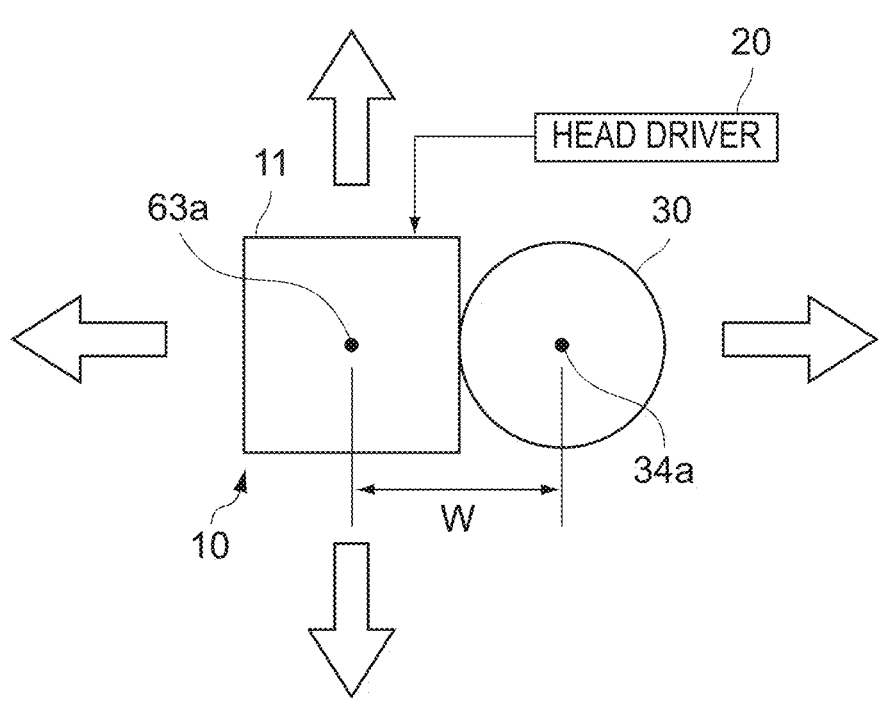
FIG. 9 is a diagram showing another example of the imager.
Figure 9:
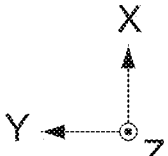
Figure 10:
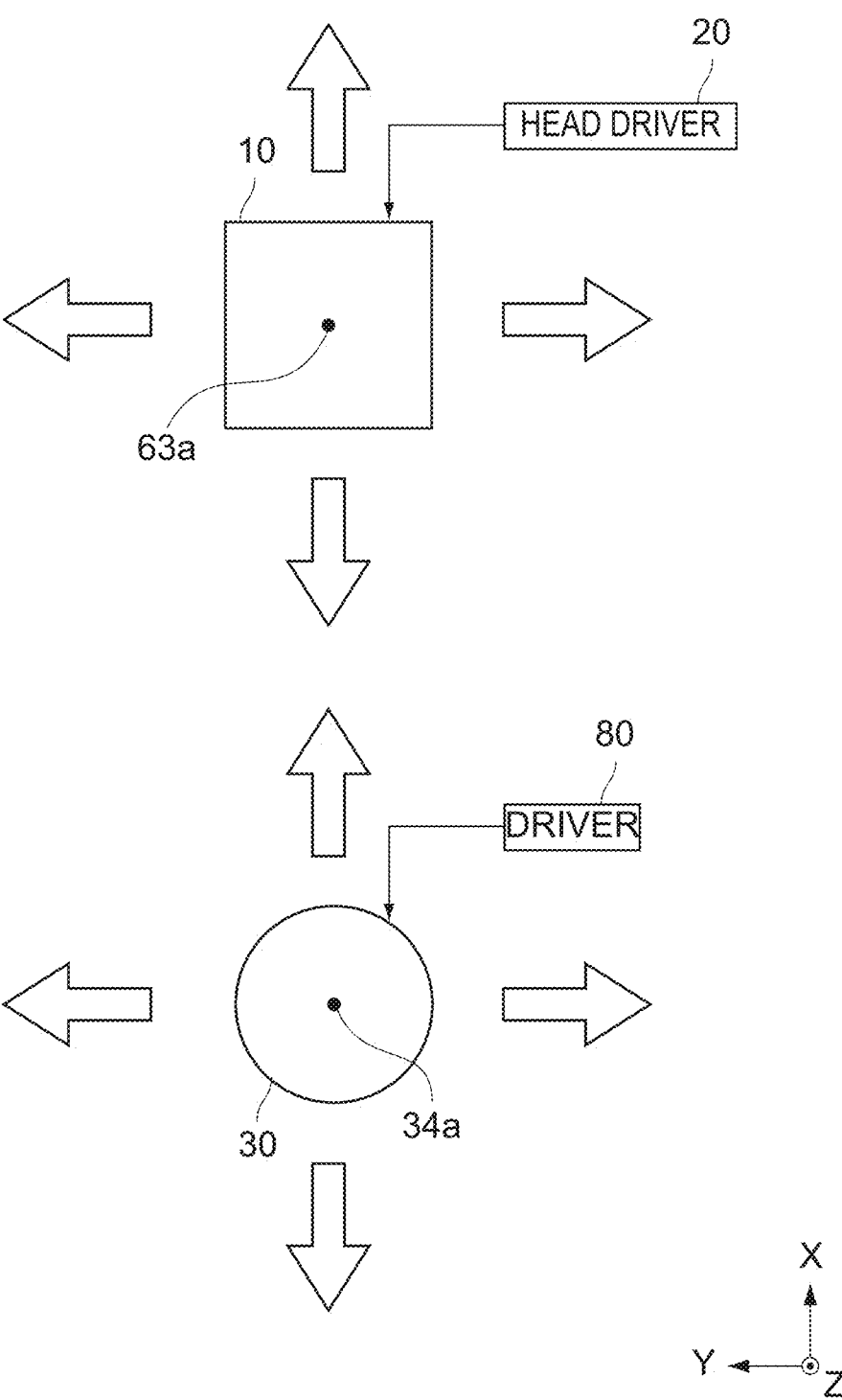
FIG. 10 is a diagram showing another example of the imager.

As shown in FIG. 1, the present example embodiment has been described, taking as an example, a configuration in which the optical axis 63a of the irradiation optical system 61 that irradiates the laser beam L1 and the optical axis 34a of the imaging optical system 31 of the imager 30 are coaxial with each other. However, the present invention should not be considered limited to such a configuration. FIG. 9 and FIG. 10 are diagrams showing other examples of the imager 30. As shown in FIG. 9 and FIG. 10, the optical axis 63a of the irradiation optical system 61 and the optical axis 34a of the imaging optical system 31 may be non-coaxial with each other. As shown in FIG. 9, the imager 30 may be provided externally to the head main body 11 of the laser head 10. In such a case, the optical axis 63a and the optical axis 34a have a relationship in which the width W is offset.

Therefore, after having acquired the coordinates information of the laser head 10 by the head driver 20 for each image captured by the imager 30, the controller 41 needs to associate, with each image, coordinates information obtained by offsetting the width W from the acquired coordinates information. With this configuration, by making the optical axis 63a and the optical axis 34a coaxial with each other as shown in FIG. 1, the controller 41 need not perform the processing after acquisition of coordinates information of the laser head 10, reducing the processing load. Offset errors associated with assembly accuracy and post-assembly deformation, which occur when the optical axis 63a and the optical axis 34a are not coaxial with each other, and the need for offset correction to resolve these errors are eliminated. It is assumed that this type of offset correction is performed frequently, such as at the time of device activation, and also affects machining efficiency. Therefore, by making the optical axis 63a and the optical axis 34a coaxial with each other, the processing load on the controller 41 after acquisition of coordinates information and the processing load at the time of device activation (machining preparation) are reduced.

As shown in FIG. 10, the laser head 10 and the imager 30 may be arranged separately, the laser head 10 may be moved by the head driver 20, and the imager 30 may be moved by a driver 80 different from the head driver 20. In such a case, the controller 41 may control the driver 80 so as to acquire coordinates information at the time of imaging performed by the imager 30 while moving the imager 30. With this configuration, by providing the imager 30 in the laser head 10 as shown in FIG. 1, one head driver 20 can be used to both move the imager 30 and move the laser head 10.

Next, processing performed after the imager 30 acquires a plurality of images will be described. The position determiner 43 of the workpiece position determination device 40 determines the position of the workpiece W in the planar direction corresponding to the boundary portion Wb, based on the image information and the coordinates information stored in the memory storage 42. When using the reference hole Wh to determine the offset of the workpiece W, the position determiner 43 determines the position of the center of the reference hole Wh in the workpiece W, based on the image information captured by the imager 30 and coordinates information of the reference hole Wh. In such a case, the position determiner 43 determines the position of the center of the reference hole Wh as a position corresponding to the boundary portion Wb. That is to say, the position determiner 43 may not have to determine the very position of the boundary portion Wb captured by the imager 30, but may determine a predetermined position determined based on the position of the boundary portion Wb. When using the end part We to determine the offset of the workpiece W, the position determiner 43 determines the position of the end portion We in the workpiece W, based on the image information of the end portion We captured by the imager 30 and the coordinates information. In such a case, the position determiner 43 determines the position of the end portion We as a position corresponding to the boundary portion Wb. That is to say, the position determiner 43 may determine the very position of the boundary portion Wb captured by the imager 30. The position determiner 43 determines the position of the center of the reference hole Wh or the end portion We, using all image information captured by the imager 30 and position information, for example.

Instead of determining a position using all image information and position information, the position determiner 43 may select image information to be used for position determination, from a plurality of pieces of image information. Selection of image information is performed by selecting, from the pieces of image information, image information for which position determination is likely to be performed (based on acquired image information or information from a separately provided sensor or the like). For example, image information selection is performed such that image information that clearly includes the boundary portion Wb is determined to be treated as a processing target, and image information that does not include the boundary portion Wb is determined to be rejected. This determination may be performed from image information alone or may use other sensor information. For example, as described above, based on the estimated position information of the reference hole Wh or the end portion We, image information estimated to include the boundary portion Wb (the specific image mentioned above) is read out from the memory or storage 42, and the position of the center of the reference hole Wh or the end portion We may be determined. The position determiner 43 may select image information using a different method. The position determiner 43 first selects, from a plurality of pieces of image information captured by the imager 30, image information used to determine a position corresponding to the boundary portion Wb. For example, the position determiner 43 may determine the brightness value of image information for each pixel and may determine the boundary portion Wb as being present and select the image information if the difference in brightness value among a predetermined number of adjacent pixels exceeds a predetermined value.

Figure 11:
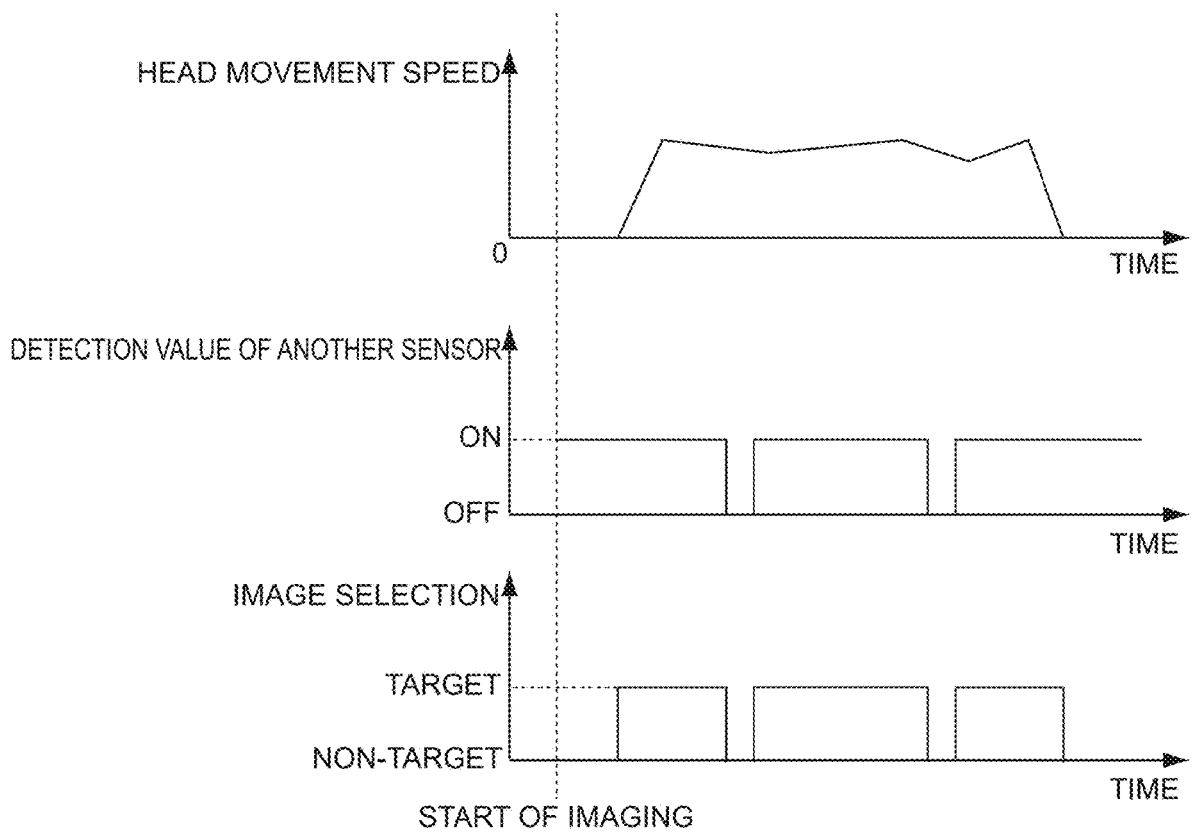
FIG. 11 is a diagram showing an example of selecting image information in a position determiner.

The position determiner 43 can also select image information using detection values from another sensor. Examples of such a sensor include a sensor that determines whether or not the workpiece W is present directly below the laser head 10. FIG. 11 is a diagram showing an example of the position determiner 43 selecting, from a plurality of pieces of image information, image information to be used to determine a corresponding position on the boundary portion Wb. The upper portion of FIG. 11 shows the moving speed of the laser head 10 when the laser head 10 moves along a prescribed trajectory T. The middle portion of FIG. 11 shows the detection results of another sensor, in which an ON value is detected when the workpiece W is present directly below the laser head 10, and an OFF value is detected when the workpiece W is not present. The lower portion of FIG. 11 shows the determination results of the position determiner 43. In FIG. 11, the horizontal axis indicates a lapse of time.

As shown in FIG. 11, the position determiner 43 can select, as a determination target, image information that is captured during a period of the moving speed of the laser head 10 exceeding 0 and the workpiece W being detected as present directly below the laser head 10, after the imager 30 starts capturing images. One of the reasons for using the moving speed as a criterion for determining whether the movement speed exceeds 0 is that it is sufficient to take one image for the same position, and another reason is that the trajectory T often starts and ends at locations other than the boundary Wb, so that images at the time of start and end of movement on the trajectory T (that is, movement speed is 0) are often not needed. While one image is sufficient for exactly the same location, if the boundary portion Wb is included in the imaging range, it is preferred that a plurality of images be acquired as much as possible even when images of approximately the same location are to be acquired. The reason for this is that robustness can still be improved even when an error occurs in the coordinates information due to reasons such as image acquisition timing. That is to say, there is an advantage in that in selecting image information, by excluding image information at the time when the moving speed is less than a predetermined value from determination criteria, image information at approximately the same location can be rejected, and that, as described above, it is possible to exclude image information that clearly does not include the boundary portion Wb immediately after the start or immediately before the end of movement (that is, when movement speed is close to 0). However, as with the above description, when the boundary portion Wb is included in the imaging range, even if images of approximately the same location are to be acquired, these images need not be excluded. The position determiner 43 may set the moving speed of the laser head 10 to a predetermined value or higher when selecting image information. In this manner, by selecting image information, it is possible to reduce the amount of information for determining the position of the center of the reference hole Wh or the end portion We, reduce the processing load on the position determiner 43, and increase the processing speed of the position determiner 43.

The position determiner 43 determines the position of the center of the reference hole Wh or the end portion We, based on selected image information and coordinates information. When determining the position of the center of the reference hole Wh, the position determiner 43, for example, extracts the position of the boundary portion Wb from each of the selected image information and the coordinates information, and the position (coordinate values) of the center is calculated based on a virtual circle estimated from a plurality of positions on the boundary portion Wb. The center of the virtual circle is estimated from a plurality of (for example, three or more) positions on the boundary portion Wb, using, for example, shape information (for example, radius or the like) of the reference hole Wh acquired preliminarily. That is to say, the position determiner 43 need not calculate the virtual circle itself. The position determiner 43 may also extract the position and shape of the boundary portion Wb from the selected image information and coordinates information and calculate the center position (coordinate values) from the curvature of the boundary portion Wb, for example. When determining the position of the end portion We, the position determiner 43, for example, extracts the position of the end portion We from each of the selected image information and the coordinates information, and calculates the position (coordinate values) of the end portion We estimated from the plurality of positions on the boundary portion Wb.

The position determiner 43 may determine the position of the center of one reference hole Wh or one end portion We from a plurality of pieces of image information and coordinates information and average the plurality of determination results to calculate the position of the one reference hole Wh or the one end portion We. In such a case, the plurality of determination results excluding the maximum value and the minimum value may be averaged. The position determiner 43 may also calculate the center of one reference hole Wh or one end portion We by means of another method, such as excluding one of determination results by removing outliers using quartiles for a plurality of determination results. For example, in the case of using quartiles, the position determiner 43 may put values of a plurality of determination results in descending order and divides them into four groups according to a preliminarily set first quartile, second quartile, and third quartile. Then, the position determiner 43 may use, as the plurality of determination results, one of values from the first quartile to the second quartile, values from the second quartile to the third quartile, and values from the first quartile to the third quartile, and exclude other values as outliers, to calculate the center of one reference hole Wh or the position of one end portion We.

For the three reference holes Wh1, Wh2, and Wh3 in the workpiece W (see FIG. 12), for example, the position determiner 43 determines the positions of centers P1, P2, and P3 from the respective boundary portions Wb thereof. The positions of the centers P1, P2, and P3 are X, Y coordinate values. The position determiner 43 determines, for example, the positions of three determination points P4, P5, and P6 (see FIG. 12) on the end portion We of the workpiece W. The positions of the determination points P4, P5, and P6 are X, Y coordinate values.

The offset determiner 44 determines the offset of the workpiece W from the reference position S, based on the results of the position determiner 43 determining the corresponding positions on the boundary portion Wb. For example, the offset determiner 44 determines the offset of the workpiece W relative to the reference position S from the positions of the centers P1, P2, and P3 of the three reference holes Wh1, Wh2, and Wh3, which are the determination results of the three corresponding positions on the boundary portion Wb. The offset determiner 44 determines the offset of the workpiece W with respect to the reference position S, for example, from the positions of the three determination points P4, P5, and P6 in on the end portion We. The determination points P4 and P5 are set on a portion of the end portion We along a first direction D1, and the determination point P6 is set on a portion of the end portion We along a second direction D2. The offset of the workpiece W is represented at least by the amount of shift in both the first direction D1 (X direction) and the second direction D2 (Y direction), which are perpendicular to each other, and the amount of rotation (tilt) around the axis in a third direction D3 (Z direction), which is perpendicular to the first direction D1 and the second direction D2. In the above description, the amount of shift in both the first direction D1 and the second direction D2 and the amount of rotation around the axis in the third direction D3 of the workpiece W relative to the reference position S are determined from the three reference holes Wh1, Wh2, and Wh3. However, the invention is not limited to this example. The offset determiner 44 may determine, from the result of determining the position of at least one of the boundary portions Wb, the shift amount relative to the reference position S in both the first direction D1 and the second direction D2 orthogonal to each other. For example, the offset determiner 44 may determine the offset of the workpiece W from one reference hole Wh. In such a case, the position determiner 43 first determines the position of the center P from the boundary portion Wb of one reference hole Wh. Then, the offset determiner 44 calculates only the shift amount of the workpiece W in both the first direction D1 and the second direction D2 relative to the reference position S, based on the determination result of the position determiner 43. That is to say, the offset determiner 44 may determine only the shift amount of the workpiece W in both the first direction D1 and the second direction D2 relative to the reference position S, based on the determination of the position corresponding to the one reference hole Wh (position of center P) performed by the position determiner 43.

Figure 12:
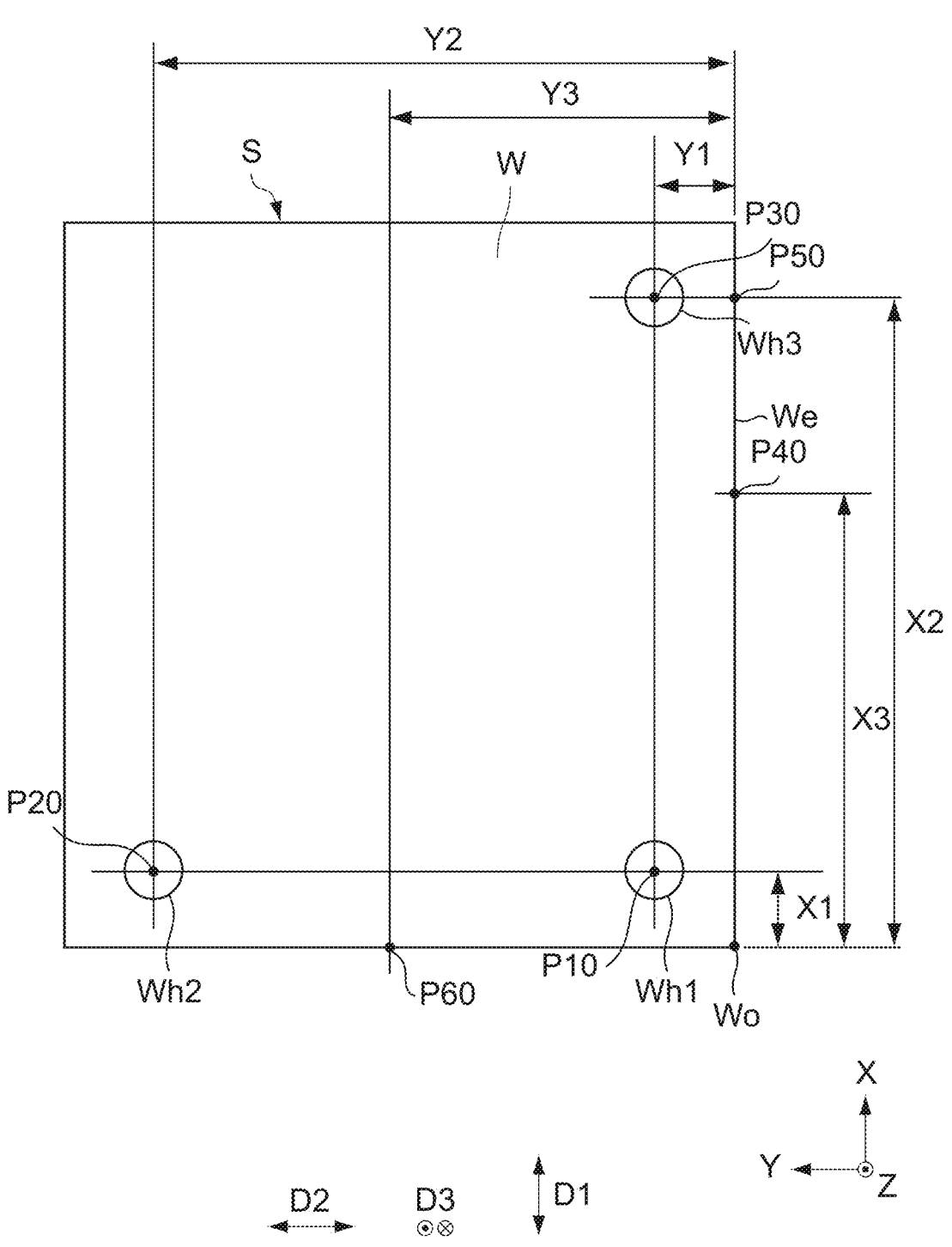
FIG. 12 is a diagram showing an example in which a workpiece is arranged at a reference position.

FIG. 12 is a diagram showing an example in which the workpiece W is arranged at the reference position S. As shown in FIG. 12, when the workpiece W is arranged in alignment with the reference position S, of the four corners of the workpiece W, the −X side and −Y side corner coincides with the origin Wo, and the end portion We is in the state of extending along the first direction D1 (X direction) and the second direction D2. In the example shown in FIG. 12, three reference holes Wh1, Wh2, and Wh3 are formed in the workpiece W. When the workpiece W is arranged in alignment with the reference position S, a center P10 of the reference hole Wh1 has coordinate values (X, Y) of (X1, Y1). Similarly, the coordinate values of a center P20 of the reference hole Wh2 are (X1, Y2). Similarly, the coordinate values of a center P30 of the reference hole Wh3 are (X2, Y1). When the workpiece W is arranged in alignment with the reference position S, a determination point P40 on the end portion We has coordinate values of (X3, 0). Similarly, the coordinate values of a determination point P50 are (X2, 0). Similarly, the coordinate values of a determination point P60 are (0, Y3). The controller 41 preliminarily acquires the coordinate values of the centers P10, P20, and P30 and the coordinate values of the determination points P40, P50, and P60 at the reference position S, and stores them in the memory or storage 42.

Figure 13:
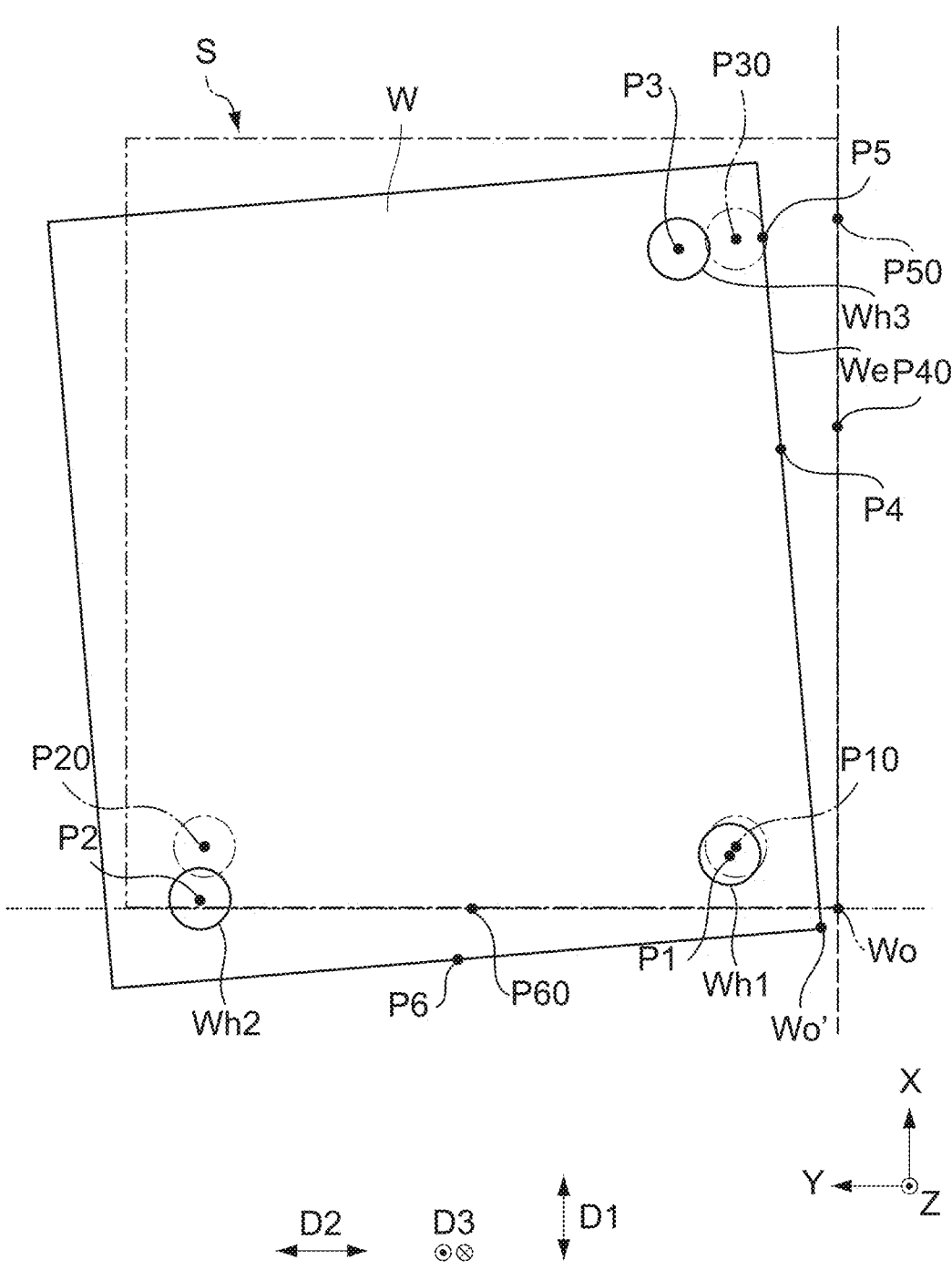
FIG. 13 is a diagram showing an example of a result of determination performed by an offset determiner.

FIG. 13 is a diagram showing an example of the result of determination performed by the offset determiner 44. In FIG. 13, the reference position S of the workpiece W is denoted by the chain line. As shown in FIG. 13, when the workpiece W is offset from the reference position S, the positions of the centers P1, P2, and P3 of the reference holes Wh1, Wh2, and Wh3 determined by the position determiner 43 are offset in the first direction D1 (X direction) and the second direction D2 (Y direction) and rotated around the axis along the third direction D3 (Z direction), from the coordinate values of the centers P10, P20, and P30 at the reference position S mentioned above. The positions of the determination points P4, P5, and P6 determined by the position determiner 43 are also offset in the first direction D1 (X direction) and in the second direction D2 (Y direction) and rotated around the axis along the third direction D3 (Z direction), from the coordinate values of the centers P40, P50, and P60 at the reference position S mentioned above. As a result, as shown in FIG. 13, the position of the origin Wo is offset to the position of the origin Wo'.

The offset determiner 44 determines the shift amount in both the first direction D1 and the second direction D2 and the rotation amount (tilt) around the axis along the third direction D3 orthogonal to the first direction D1 and the second direction D2, at least from the coordinate values of three centers P1, P2, and P3 (six values in total) or the coordinate values of the determination points P4, P5, and P6 (six values in total) determined by the position determiner 43. The offset determiner 44 has three determination parameters, namely, the shift amount in both the first direction D1 and in the second direction D2, and the rotation amount around the axis along the third direction D3 and can reliably calculate two shift amounts and a rotation amount from the coordinate values (six values in total) mentioned above. Also, in addition to the three determinations, that is, two shift amounts and a rotation amount, the offset determiner 44 can determine the amount of expansion and contraction of the workpiece W in the first direction D1 (X direction) (X scale), the amount of expansion and contraction of the workpiece W in the second direction D2 (Y direction) (Y scale), and the degree of orthogonality between the first direction D1 and the second direction D2, using the six values in total.

If the offset determiner 44 determines an offset of the workpiece W, the controller 41 controls the head driver 20 to move the laser head 10 in accordance with the offset. For example, according from the reference position S, the controller 41 corrects the coordinates regarding the arrangement of the workpiece W during laser machining. In a machining program that includes information regarding the movement of the laser head 10, the controller 41 may change the target coordinate values for the laser head 10 according to the offset and execute the machining program using the new coordinate values.

Figure 14:
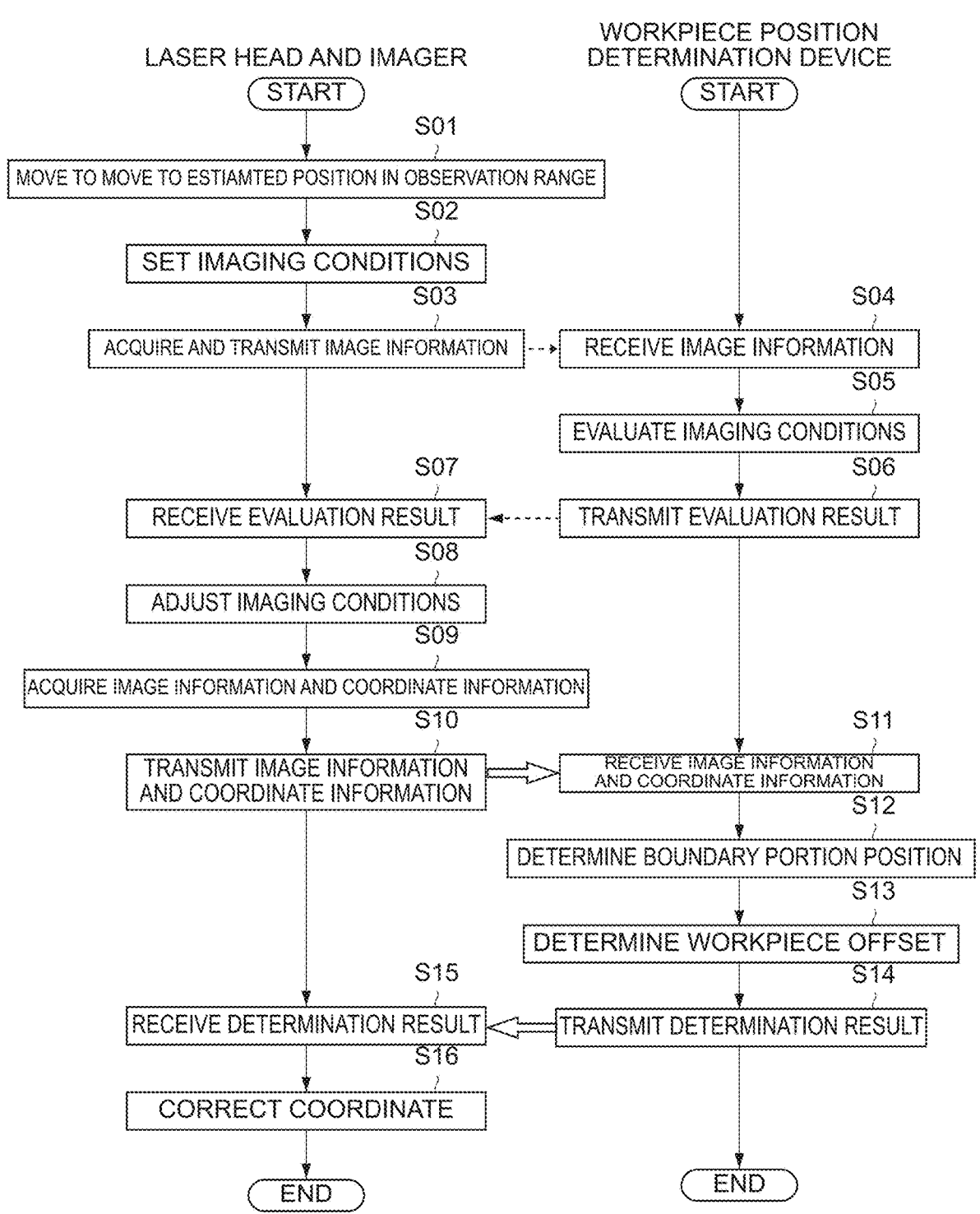
FIG. 14 is a flowchart showing an example of a workpiece position determination method according to an example embodiment of the present invention.

FIG. 14 is a flowchart showing an example of a workpiece position determination method according to the present example embodiment. In FIG. 14, the flow of the laser head 10 and the imager 30 and the flow of the workpiece position determination device 40 excluding the imager 30 are both shown in time series. As shown in FIG. 14, the controller 41 first moves the laser head 10 to the estimated position of the observation range (Step S01). Based on the estimated position information of the reference hole Wh or the end portion We acquired preliminarily, the controller 41 controls the head driver 20 so as to move the laser head 10, for example, to the vicinity of the reference hole Wh or the end portion We serving as the estimated position of the observation range.

Subsequently, the controller 41 sets imaging conditions for the imager 30 (Step S02). The controller 41 sets imaging conditions such as focal position and exposure in the imaging optical system 31 of the imager 30. The controller 41 performs control so that, at the time of imaging performed by the imager 30, the laser array 70 emits the illumination laser beam L2 via the illumination optical system 71. Subsequently, the controller 41 causes the imager 30 to capture the estimated position of the observation range to acquire image information and transmit the image information to the workpiece position determination device 40 (Step S03). The image information captured in Step S03 is used for evaluating the imaging conditions. The number of pieces of image information in Step S03 may be one or more.

The controller 41 receives the image information transmitted from the imager 30 (Step S04) and evaluates the imaging conditions based on the received image information (Step S05). For example, evaluation image information for evaluating imaging conditions may be stored in the memory or storage 42, and the controller 41 may compare the received image information with the evaluation image information stored in the memory or storage 42, to thereby evaluate the imaging conditions such as defocus (blur), exposure, and so forth. Subsequently, the controller 41 transmits the evaluation result to the imager 30 (Step S06). The imager 30 receives the evaluation result transmitted (Step S07) and adjusts the imaging conditions based on the evaluation result (Step S08). It should be noted that Step S03 to Step S08 may be performed only once at the beginning, or may be repeatedly performed several times, for example, by performing feedback control on focus and brightness.

Then, the imager 30 acquires image information while moving along the prescribed trajectory T, and further acquires coordinates information at the time of the imager 30 capturing image information (Step S09). After having moved the imager 30 to the start points TA0, TB0 (see FIG. 3, FIG. 4), the controller 41 controls the imager 30 so as to perform imaging at a predetermined frame rate while moving from the start points TA0, TB0 along the prescribed trajectories TA, TB. The imager 30 moves along the prescribed trajectories TA, TB from the start points TA0, TB0, image-captures the reference hole Wh or the boundary portion Wb of the end portion We to acquire image information, acquires the coordinates information of the imaging positions where the image information was captured, and associates them with the image information.

For example, the imager 30 performs image capturing while acquiring the coordinates information of the laser head 10 from the head driver 20 and associates the coordinates information of the laser head 10 acquired at the time of performing image capturing with the image information. As described above, in the case where the position determiner 43 uses information from another sensor or speed information of the laser head 10 when performing position determination, these pieces of information are also associated with the image information captured by the imager 30 at the same time as the imaging is performed (or at a predetermined timing after imaging). It should be noted that Step S09 is performed for each of the plurality of reference holes Wh or the plurality of end portions We. Subsequently, the imager 30 transmits the acquired image information and coordinates information to the workpiece position determination device 40 (Step S10). The imager 30 collectively transmits the plurality of pieces of image information captured while moving along the prescribed trajectory T and the position information to the workpiece position determination device 40. By the imager 30 transmitting a plurality of pieces of image information and position information at once in this manner, the length of time required for the transmission process can be reduced.

Next, the controller 41 receives the transmitted image information and coordinates information (Step S11) and stores them in the memory or storage 42. Subsequently, the position determiner 43 determines the position of the boundary portion Wb based on the image information and coordinates information stored in the memory or storage 42 (Step S12). The position determiner 43 determines, for example, the position (coordinate values) of the center calculated from the boundary portion Wb of the reference hole Wh, or the position (coordinate values) of the end portion We that is the boundary portion Wb.

Then, the offset determiner 44 determines the offset of the workpiece W, based on the determination result of the position determiner 43 (Step S13). For example, from the positions of the centers of at least three reference holes Wh or the positions of at least three end portions We, the offset determiner 44 determines, as the offset of the workpiece W relative to the reference position S, the shift amount in both the first direction D1 and the second direction D2 and the rotation amount around the axis along the third direction D3 of the workpiece W relative to the reference position S. In Step S09 to Step S13, the offset of the workpiece W relative to the reference position S may be determined from the center position of one reference hole Wh. In such a case, in Step S09, the imager 30 images the one reference hole Wh. After Step S10 and Step S11, in Step S12, the position determiner 43 determines the position of the center P from the boundary portion Wb of the one reference hole Wh. Then, in Step S13, the offset determiner 44 calculates only the shift amount of the workpiece W in both the first direction D1 and the second direction D2 relative to the reference position S. In this manner, the offset of the workpiece W may be determined using one reference hole Wh. Next, the controller 41 transmits the determination result of the offset determiner 44 to the laser head 10 (Step S14). The laser head 10 receives the transmitted determination result (Step S15), and the coordinates of the workpiece W at the time of performing laser machining are corrected based on the received determination result (Step S16). In this way, by performing the offset determination processing shown in Steps S10 to Step S15, communications during control between the laser head 10, the imager 30, and the workpiece position determination device 40 are eliminated, and determination of the offset of the workpiece W can thereby be sped up. That is to say, as shown by the white arrows in FIG. 14, communications between the laser head 10, the imager 30, and the workpiece position determination device 40 include transmissions and receptions from Step S10 to Step S11, and transmissions and receptions from Step S14 to Step S15 only, and no communication is performed between the laser head 10, the imager 30, and the workpiece position determination device 40 from Step S11 to Step S14. As a result, communication delays between the laser head 10, the imager 30, and the workpiece position determination device 40 need not be considered. The laser head 10 moves in accordance with the corrected coordinates, and can thereby perform accurate laser machining on the workpiece W. The series of processes ends when Step S16 is completed.

According to the workpiece position determination device 40 and the workpiece position determination method of the present example embodiments, the imager 30 is moved along a prescribed trajectory T in a plan view, and the offset of the workpiece W relative to the reference position S is determined based on image information captured by the imager 30 during this period and coordinates information. As a result, feedback control of the head driver 20 is not required for the movement of the imager 30. Therefore, it is not necessary to take into consideration delays in image processing calculations and delays in communications such as move instructions with respect to the movement of the imager 30, and as a result, the length of time required to determine the position of the workpiece W can be reduced. In the laser machining device 1 including the workpiece position determination device 40, the length of time required to determine the offset of the workpiece W is reduced, and as a result, the efficiency of machining performed on the workpiece W can be improved.

Example embodiments of the present invention have been described above. However, the technical scope of the present invention is not limited to the description of the above example embodiments. It is also apparent to those skilled in the art that various modifications or improvements can be added to the above example embodiments. The technical scope of the present invention also encompasses one or more of such modifications or improvements. One or more of the elements, features, or characteristics described in the above example embodiments may be omitted in some cases. One or more of the elements, features, or characteristics described in the above example embodiments may be combined where appropriate. The order of executing processes shown in the present example embodiment can be realized in an arbitrary order unless an output of the previous processing is used in the following processing. While operations in the above example embodiments have been described with expressions such as "first", "next", and "subsequently" for the sake of convenience, the operations need not always be implemented in that order.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A workpiece position determination device comprising:
an imager;
a driver to cause the imager to move relative to a workpiece including a planar surface, in a planar direction parallel or substantially parallel to the planar surface;
a controller configured or programmed to control the driver so that the imager moves along a prescribed trajectory that passes through a plurality of locations in a boundary portion in the planar surface in a plan view; and
a storage to store image information captured by the imager while the imager moves along the prescribed trajectory, and coordinate information of the imager at a time of capturing each image information; wherein
the controller is configured or programmed to define and function as:
a position determiner to determine the position of the workpiece in the planar direction corresponding to the boundary portion, based on the image information and the coordinate information stored in the storage; and
an offset determiner to determine an offset of the workpiece from a reference position, based on a determination result from the position determiner.

2. The workpiece position determination device according to claim 1, wherein an imaging optical system in the imager is coaxial with a laser beam irradiation optical system in a machining unit of a laser machining device that machines the workpiece by irradiating the workpiece with a laser beam.

3. The workpiece position determination device according to claim 1, wherein
the controller is configured or programmed to control the driver so that the imager captures an image of a reference hole in the workpiece while moving along a prescribed trajectory that passes through a plurality of locations on an inner peripheral edge of the reference hole in a plan view; and
the position determiner is operable to calculate a position of a center of the reference hole in the workpiece.

4. The workpiece position determination device according to claim 3, wherein the controller is configured or programmed to control the driver so that the imager moves along a trajectory that defines a prescribed point-symmetric shape or line-symmetric shape in a plan view.

5. The workpiece position determination device according to claim 3, wherein an observation range of one image captured by the imager is smaller than the reference hole.

6. The workpiece position determination device according to claim 1, wherein
the controller is configured or programmed to control the driver so that the imager captures an image of an end portion corresponding to a side of the workpiece while moving along a prescribed trajectory that passes through a plurality of locations on the end portion in a plan view; and
the position determiner is operable to calculate a position of the end portion on the workpiece.

7. The workpiece position determination device according to claim 6, wherein the controller is configured or programmed to control the driver so that the imager moves along a trajectory that defines a prescribed linear shape, a curved shape, a zigzag shape, or a spiral shape in a plan view.

8. The workpiece position determination device according to claim 1, wherein the position determiner is operable to select, among a plurality of pieces of the image information captured by the imager, the image information used to determine a position of the boundary portion, and determine the position of the boundary portion, based on the coordinate information corresponding to the image information selected.

9. The workpiece position determination device according to claim 1, wherein the offset determiner is operable to determine, from a result of determining a position of at least one of the boundary portions, a shift amount relative to the reference position in each of a first direction and a second direction orthogonal to each other.

10. The workpiece position determination device according to claim 9, wherein the offset determiner is operable to determine, from results of determining positions of at least three of the boundary portions, a shift amount relative to the reference position in each of a first direction and a second direction orthogonal to each other, and a rotation amount around an axis of a third direction orthogonal to the first direction and the second direction.

11. A laser machining device comprising the workpiece position determination device according to claim 1, the laser machining device including a machining unit to irradiate a workpiece including a planar surface with a laser beam to machine the workpiece.

12. A workpiece position determination method comprising:
causing an imager to move relative to a workpiece including a planar surface, in a planar direction parallel or substantially parallel to the planar surface and along a prescribed trajectory that passes through a plurality of locations in a boundary portion in the planar surface in a plan view;
storing image information captured by the imager while the imager moves along the prescribed trajectory, and coordinates information of the imager at a time of capturing each image information;
determining the position of the workpiece in the planar direction corresponding to the boundary portion, based on the image information and the coordinates information stored in the storage; and
determining an offset of the workpiece from a reference position, based on a result of determining the position corresponding to the boundary portion.

* * * * *